(12) United States Patent
Eichen et al.

(10) Patent No.: US 9,031,059 B2
(45) Date of Patent: May 12, 2015

(54) FIXED MOBILE CONVERGENCE AND VOICE CALL CONTINUITY USING A MOBILE DEVICE/DOCKING STATION

(75) Inventors: Elliot G. Eichen, Arlington, MA (US); Lee N. Goodman, Tyngsboro, MA (US); James Flynn, Stoughton, MA (US); Sujin Catherine Chang, Stow, MA (US); Rafael Andres Gaviria Velez, Medford, MA (US); Rezwanul Azim, Arlington, MA (US); Gowtham Javaregowda, Waltham, MA (US); Punita Mishra, Potomac, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 113 days.

(21) Appl. No.: 13/355,630

(22) Filed: Jan. 23, 2012

(65) Prior Publication Data

US 2012/0157068 A1 Jun. 21, 2012

Related U.S. Application Data

(63) Continuation-in-part of application No. 12/971,409, filed on Dec. 17, 2010, and a continuation-in-part of application No. 13/116,123, filed on May 26, 2011, and a continuation-in-part of application No. 13/040,336, filed on Mar. 4, 2011.

(51) Int. Cl.
  *H04L 12/66* (2006.01)
  *H04W 4/16* (2009.01)
  *H04L 29/06* (2006.01)
  *H04J 1/16* (2006.01)
  *H04J 3/14* (2006.01)
  *H04L 1/00* (2006.01)
  *H04L 12/26* (2006.01)
  *H04L 12/28* (2006.01)
  *H04W 4/00* (2009.01)
  *G06F 1/16* (2006.01)

(52) U.S. Cl.
  CPC ........ *H04W 4/16* (2013.01); *H04M 2203/1091* (2013.01); *G06F 1/1632* (2013.01); *H04L 65/1053* (2013.01); *H04L 65/1073* (2013.01)

(58) Field of Classification Search
  USPC ........... 379/242; 455/426.2, 461; 370/221.14, 370/242, 352
  See application file for complete search history.

(56) References Cited

U.S. PATENT DOCUMENTS

| | | | |
|---|---|---|---|
| 6,148,074 A * | 11/2000 | Miloslavsky et al. | 379/242 |
| 7,110,789 B1 | 9/2006 | Curtiss et al. | |
| 7,143,198 B2 | 11/2006 | Lee et al. | |
| 2005/0090271 A1* | 4/2005 | Sylvain | 455/461 |
| 2005/0186960 A1 | 8/2005 | Jiang | |

(Continued)

*Primary Examiner* — Helal A Algahaim
*Assistant Examiner* — Mahmoud Ismail

(57) ABSTRACT

A network mobility device registers with a switch in a telephone network, and receives a first message from a docking station indicating that a mobile device has undocked from the docking station. The docking station includes a Voice over Internet Protocol (VoIP) phone that has a wired connection to a data network, and the mobile device includes a portable digital computing device. The network mobility device receives a call, destined for the mobile device, routed from the switch, and sends an alert message, based on the undocking of the mobile device and the received call, to the mobile device to notify a client of the mobile device of the call. The network mobility device forwards the call, based on the undocking of the mobile device, from the network mobility device to the client at the mobile device via the data network.

20 Claims, 22 Drawing Sheets

(56) References Cited

U.S. PATENT DOCUMENTS

| | | |
|---|---|---|
| 2005/0227666 A1 | 10/2005 | Cheng |
| 2006/0187900 A1 | 8/2006 | Akbar |
| 2006/0242305 A1 | 10/2006 | Alnas |
| 2008/0056472 A1 | 3/2008 | Tanemura et al. |
| 2008/0139222 A1 | 6/2008 | Falvo et al. |
| 2008/0278894 A1 | 11/2008 | Chen et al. |
| 2009/0022301 A1* | 1/2009 | Mudaliar ................ 379/221.14 |
| 2009/0023442 A1* | 1/2009 | Ahmed et al. ............. 455/426.2 |
| 2009/0059907 A1 | 3/2009 | Sindhwani et al. |
| 2009/0097629 A1 | 4/2009 | Huslak et al. |
| 2009/0305683 A1 | 12/2009 | Gupta et al. |
| 2010/0074247 A1 | 3/2010 | Clark et al. |
| 2010/0130169 A1 | 5/2010 | Narayanaswamy et al. |
| 2010/0157990 A1 | 6/2010 | Krzyzanowski et al. |
| 2011/0040858 A1 | 2/2011 | Gum |
| 2011/0206052 A1 | 8/2011 | Tan et al. |
| 2011/0287820 A1 | 11/2011 | Harrison et al. |

* cited by examiner

FIXED MOBILE CONVERGENCE AND VOICE CALL CONTINUITY USING A MOBILE DEVICE/DOCKING STATION

RELATED APPLICATION

The present application is a continuation-in-part (CIP) of U.S. application Ser. No. 12/971,409, entitled "Mobile Phone Docking Station for VoIP" and filed Dec. 17, 2010; U.S. application Ser. No. 13/116,123 (Attorney Docket No. 20100804), entitled "Mobile Phone/Docking Station Call Continuity" and filed May 26, 2011; and U.S. application Ser. No. 13/040,336, entitled "Original Calling Identification with Mobile Phone in Docked Mode" and filed Mar. 4, 2011; the disclosures of which are incorporated by reference herein in their entirety.

BACKGROUND

A recent trend for reducing service costs in telecommunications networks involves the use of Voice over Internet Protocol (VoIP) for carrying calls between source and destination phones. IP networks typically incur minimal costs to carry data from sources to destinations, as opposed to Public Switched Telephone Networks (PSTN) which typically incur much higher costs to carry phone calls from sources to destinations. By using VoIP (e.g., IP packets carrying audio data) for carrying a call for most of the distance of the call, instead of using a PSTN, the cost of the call can be reduced relative to having a PSTN carry the entirety of the call. Usually, VoIP involves a call being carried via the Internet to a point in the PSTN very close to the call destination. At that point, the call is switched to the PSTN for completion of the connection with the call destination. By minimizing the distance that the call is carried on the PSTN, the cost of the call may be substantially reduced relative to solely using the PSTN for the entirety of the call.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein support fixed mobile convergence and voice call continuity for a mobile device/docking station through the use of a mobility server that can register on a mobile device's behalf and assist in routing calls to and from the mobile device. "Fixed mobile convergence," as referred to herein, involves two different telephone numbers (TNs) being supported on a single mobile device, such as, for example, a telephone number to the mobile device in a wireless network (e.g., cellular network) and a VoIP telephone number to the mobile device in a data network. "Voice call continuity," as referred to herein, involves maintaining the call state and the audio stream for a call when the call switches transport networks (e.g., from IP to cellular). The mobility server described herein registers on a mobile device's behalf using "shared call appearance." With "shared call appearance," two devices or user agents (i.e., the mobile device and the mobility server) both register to the same account such that an inbound call to that account rings both devices. Fixed mobile convergence and voice call continuity are implemented herein with the use of a docking station which serves as a VoIP telephone and which can dock with a mobile device.

Figure 1A:
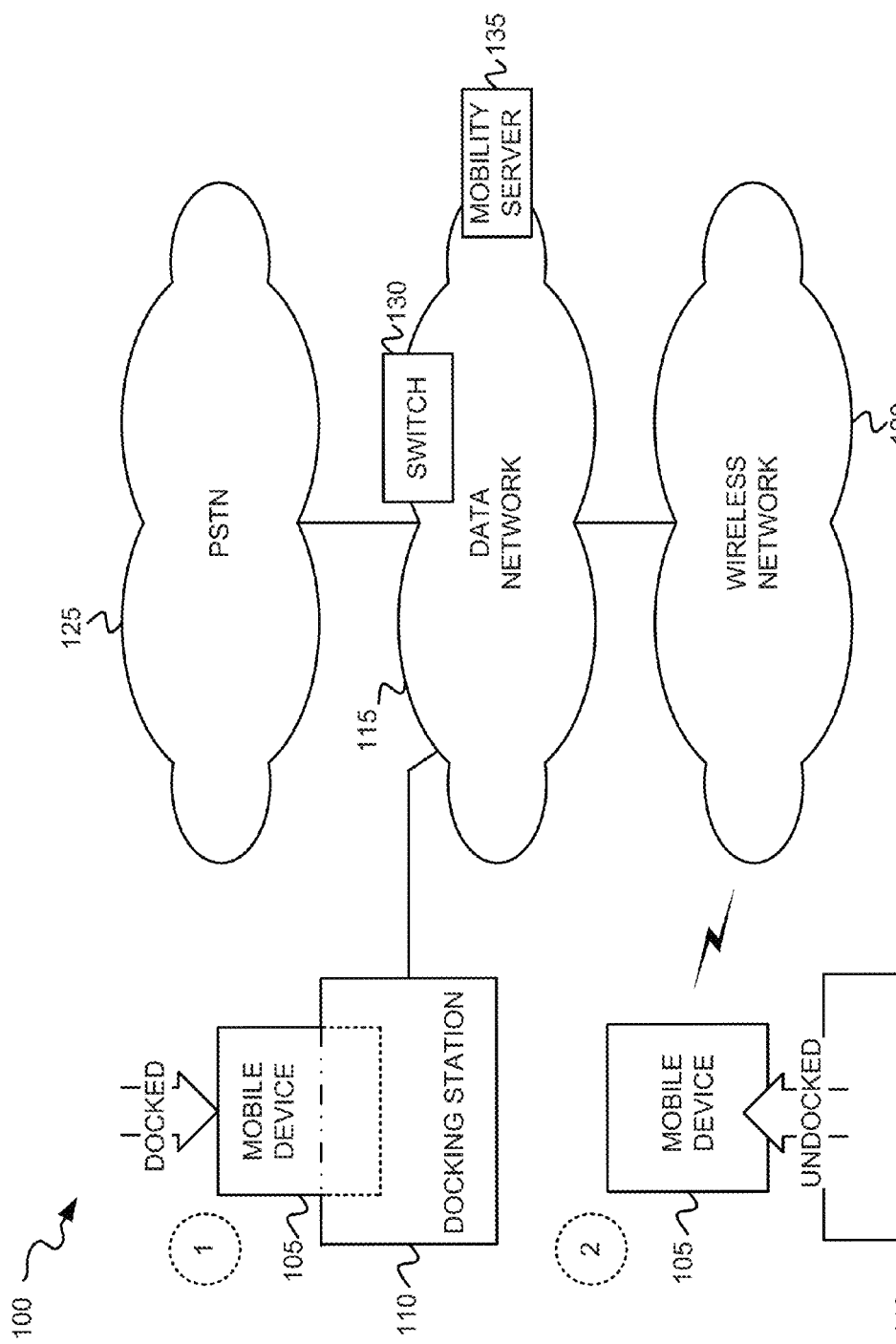
FIG. 1A is a diagram that depicts an exemplary network environment in which a mobile device, that may be docked into a docking station, may send or receive calls over one or more multiple networks via multiple different telephone numbers.

FIG. 1A is a diagram that depicts an exemplary network environment 100 in which a mobile device 105, that may be docked into a docking station 110, may send or receive voice calls over one or more multiple networks via multiple different telephone numbers. For example, mobile device 105 may have a first telephone number for VoIP calls via data network 115 and a second telephone number for calls via wireless network 120. Network environment 100 may include mobile device 105, docking station 110, data network 115, wireless network 120, Public Switched Telephone Network (PSTN) 125, switch 130 and mobility server 135.

Mobile device 105, when docked with docking station 110 (identified with a "1" in FIG. 1A) may send or receive calls via data network 115. Mobile device 105, when undocked from docking station 110 (identified with a "2" in FIG. 1A) may send or receive calls via wireless network 120. Mobile device 105 may additionally receive calls routed from PSTN 125 via switch 130.

Docking station 110 may include a VoIP phone that has a wired connection to data network 115 and which also has a docking port that permits mobile device 105 to be "docked" with docking station 110. Mobile device 105 may include, for example, a cellular telephone (e.g., a smart phone), a tablet computer, a personal digital assistant (PDA), or another type of portable digital computing device that has the capability to communicate via multiple different types of network connections (e.g., wired, wireless, etc.). Mobile device 105 may send/receive data traffic via one or more applications executing at mobile device 105. The applications may include various types of applications, such as, for example, a VoIP client application, an email application, a web browsing application, an instant messaging (IM) application, etc.

Switch 130 may include a network device (e.g., a Private Branch Exchange (PBX)) connected to PSTN 125 that may route calls, to an "enterprise" telephone number (TN) associated with mobile device 105, via PSTN 125 and data network 115 to mobile device 105. The enterprise TN may include a VoIP telephone number in data network 115 associated with mobile device 105.

Mobility server 135 may include a network device that connects to data network 115 and which registers with switch 130 on behalf of mobile device 105. Mobility server 135 receives docking status messages from docking station 110 that indicate whether mobile device 105 is docked with docking station 110, whether mobile device 105 is SIP registered with switch 130 and/or whether mobile device 105 is engaged in an active call. When mobile device 105 is undocked from docking station 110, switch 130 may route calls to/from mobile device 105 to mobility server 135 based on the registration from mobility server 135. Mobility server 135 may forward those calls to mobile device 105 via, for example, wireless network 120.

PSTN 125 may include one or more PSTNs. The PSTNs may include, for example, circuit-switched PSTNs. In addition to connecting to data network 115, PSTN 125 may connect to wireless network 120 (not shown in FIG. 1A). The connection between PSTN 125 and wireless network 120 permits calls to be routed to/from switch 130 from/to mobile device 105 via wireless network 120. Data network 115 may include one or more packet-switched networks that implement Ethernet protocol or Internet Protocol (IP) and which may carry VoIP traffic. Data network 115 may include one or more telecommunications networks (e.g., Public Switched Telephone Networks (PSTNs)), LANs, WANs, metropolitan area networks (MANs), an intranet, the Internet, or a cable network (e.g., an optical cable network).

Wireless network 120 may include a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs) that includes a packet-switched network, such as, for example, General Packet Radio Service (GPRS), Cellular Digital Packet Data (CDPD), or Mobile IP networks.

The configuration of network components of network environment 100 illustrated in FIG. 1A is for illustrative purposes. Other configurations may be implemented. Therefore, network environment 100 may include additional, fewer and/or different components than those depicted in FIG. 1A.

Figure 1B:
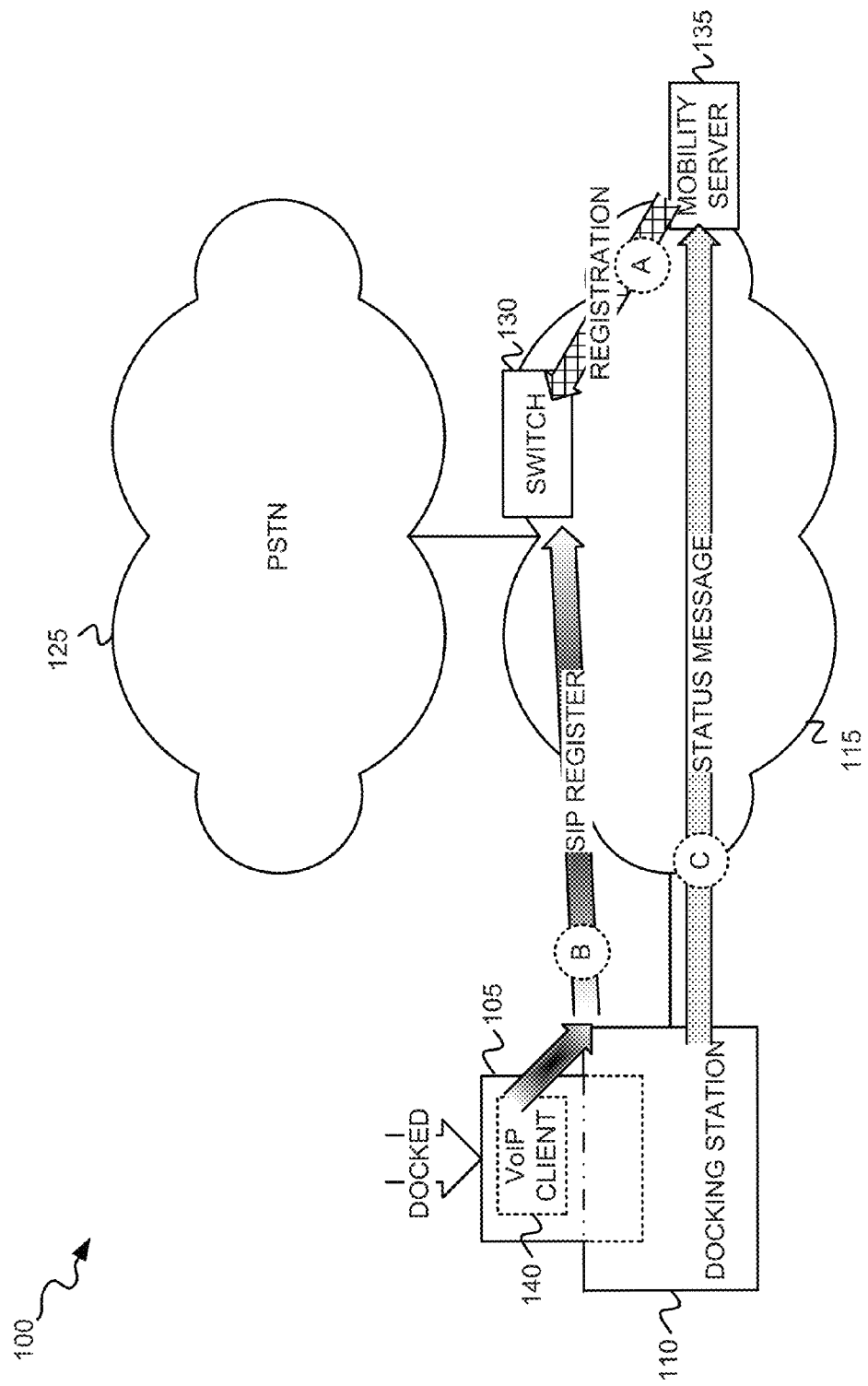
FIG. 1B is a diagram that illustrates messaging associated with a switch routing inbound or outbound enterprise calls to/from a mobile device.

FIG. 1B illustrates exemplary messaging associated with switch 130 routing inbound or outbound enterprise calls to/from mobile device 105. As shown in FIG. 1B, mobility server 135 may send a registration message (identified with an "A") to switch 130 to register with switch 130 on behalf of mobile device 105. This registration message identifies mobility server 135 as a second shared call appearance (SCA) endpoint for a given user account (e.g., mobile device 105's enterprise telephone number). As further shown in FIG. 1B, upon docking with docking station 110, VoIP client 140 of mobile device 105 sends a Session Initiation Protocol (SIP) register message (identified with a "B") to switch 130 to register mobile device 105 with switch 130. Upon registration with switch 130, switch 130 routes inbound calls to VoIP client 140 at mobile device 105 via data network 115 and docking station 110. Docking station 110 may, upon a docking or undocking event, or periodically, send a status message (identified with a "C") to mobility server 135 that identifies the docking status of mobile device 105 (e.g., docked or undocked) and which may also identify whether VoIP client 140 has registered with switch 130, and which may additionally identify whether mobile device 105 is currently engaged in an active call.

Figure 2A:
FIGS. 2A and 2B are diagrams that depict an exemplary docking station in which a mobile device may be docked.
Figure 2B:

FIGS. 2A and 2B depict an example of a physical configuration of docking station 110, mobile device 105, and a mobile device tray 200, and the physical interconnection of docking station 110, mobile device 105, and mobile device tray 200. Mobile device tray 200 may include a physical configuration that fits the external configuration of mobile device 105, such that mobile device 105 may be inserted into mobile device tray 200. In addition, mobile device 105's Universal Serial Bus (USB) port (or other connector ports) may interconnect with an appropriate physical and electrical port on mobile device tray 200. Subsequent to insertion of mobile device 105 into mobile device tray 200, tray 200 may be inserted into a docking port 210 of docking station 110 to complete the USB port interconnection between mobile device 105 and docking station 110. FIG. 2B depicts mobile phone 105 inserted into docking port 210 of docking station 110. While docked in docking station 110, mobile device 105 may be used for controlling the operation of docking station 110. For example, if mobile device 105 has a touch panel display, then the touch panel display may be used for dialing or initiating a VoIP call, instead of using a keypad on docking station 110.

The physical configuration of docking station 110 shown in FIGS. 2A and 2B represents one exemplary implementation. Other physical configurations may be alternatively used. For example, though only one docking port 210 is shown, multiple docking ports 210 may be incorporated into docking station 110 in other implementations. As another example, docking station 110 may not include a keypad, or other user controls, and merely may be faceless with one or more docking ports 210 for docking a mobile device(s) 105.

Figure 3:
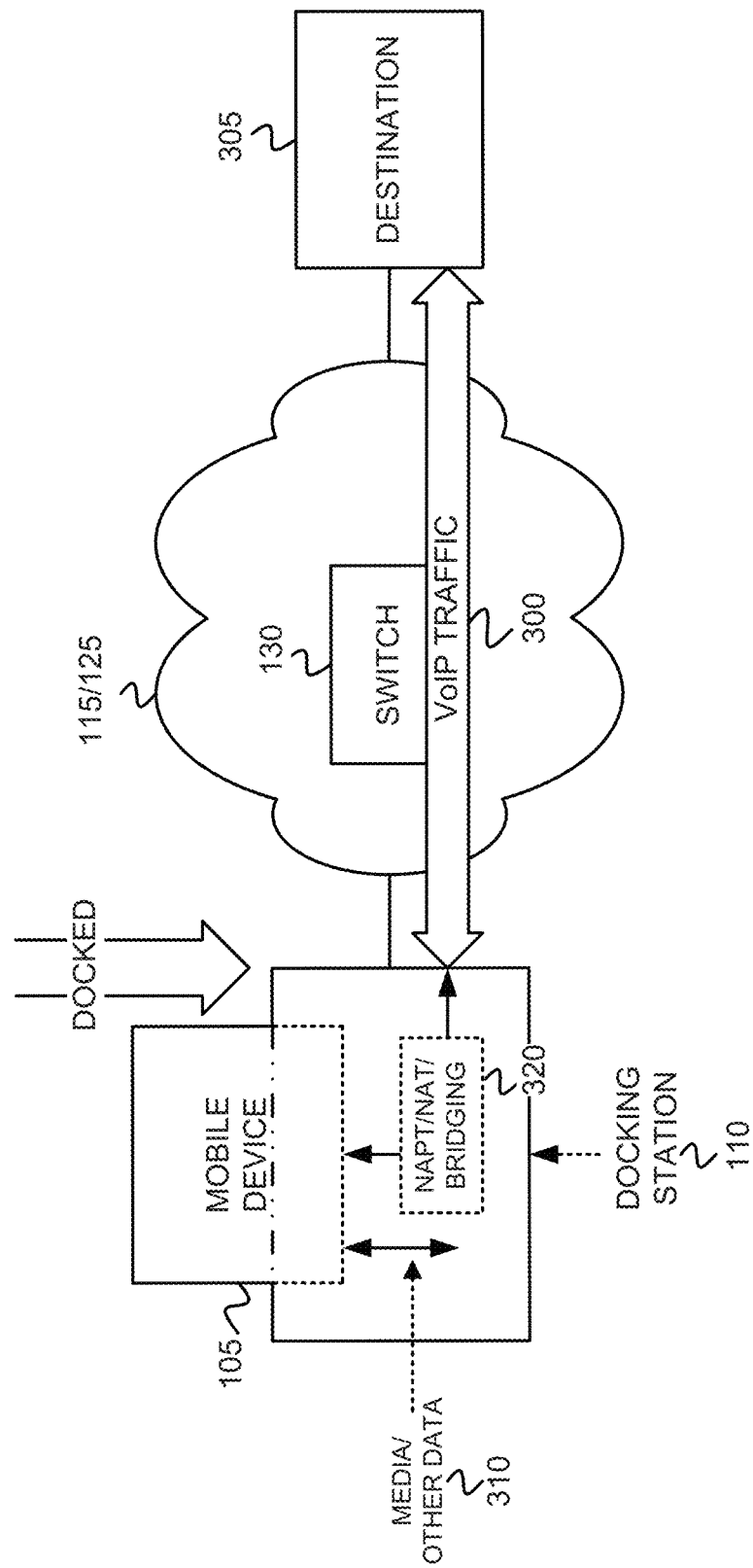
FIG. 3 is a diagram that depicts the exemplary docking station of FIG. 1A enabling a VoIP connection between a docked mobile device and a data network.

FIG. 3 depicts an exemplary embodiment in which mobile device 105 is docked with docking station 110, and mobile device 105 sends a call using VoIP traffic 300 via data network 115, PSTN 125 and switch 130 to a destination device 305. As shown in FIG. 3, mobile device 105 may be docked (i.e., physically inserted into a docking port) with docking station 110. Upon being docked with docking station 110, mobile device 105 may exchange media (e.g., audio or video) or other data 310 with docking station 110. The exchanged media 310 may include audio streamed from a microphone of docking station 110 to mobile device 105, or from a microphone of mobile device 105 to docking station 110. The exchanged media may further include video streamed from a camera (or memory) of docking station 115 to mobile device 105, or from a camera (or memory) of mobile phone 105 to docking station 110.

As further shown in FIG. 3, docking station 110 may connect to data network 115 and PSTN 125 for sending and/or receiving VoIP traffic 300 to/from mobile device 105 via switch 130. Docking station 110 may forward VoIP traffic 300 from network 115 to mobile device 105, and from mobile device 105 to network 115 via a system 320 that implements Network Address Port Translation (NAPT), Network Address Translation (NAT), or a bridging mode. When implementing NAPT or NAT, system 320 may route packets associated with VoIP traffic 300 to/from mobile device 105. A side of docking station 110 facing network 115 may have a public, routable Internet Protocol (IP) address on network 115, while a side of docking station 110 facing mobile device 105 may have multiple, statically configured private IP addresses. The routable IP address of docking station 110 facing network 115 may be statically configured, or may be obtained via the Dynamic Host Configuration Protocol (DHCP) from network 115/125. Mobile device 105 may have multiple statically configured private IP addresses (e.g., on a same network as the private IP address of docking station 110). Mobile device 105 may use the routable IP address of docking station 110 as a default gateway for sending VoIP packets to a destination device 305 via network 115 and switch 130. A physical and layer 2 connection between docking station 110 and mobile device 105 may include Ethernet over Universal Serial Bus (USB) (e.g., Ethernet frames encapsulated in USB packets). Media 310 may be streamed from one of the multiple private IP addresses associated with mobile device 105 to the IP address associated with docking station 110, or may be streamed in the reverse direction.

When implementing the bridging mode, system 320 may forward packets, at layer 2, from data network 115, though docking station 110, to mobile device 105. Additionally, system 320 may forward packets, at layer 2, from mobile device 105, though docking station 110, to data network 115. Docking station 100 may have an IP address, routable in data network 115, and mobile device 105 may also have a different IP address that is routable in data network 115. System 320, implementing the bridging mode, may forward packets received at docking station 110 from data network 115 to the routable IP addresses of mobile device 105. Additionally, when implementing the bridging mode, system 320 may forward packets, received from mobile device 105 at the routable IP address of docking station 110, to data network 115.

Figure 4:
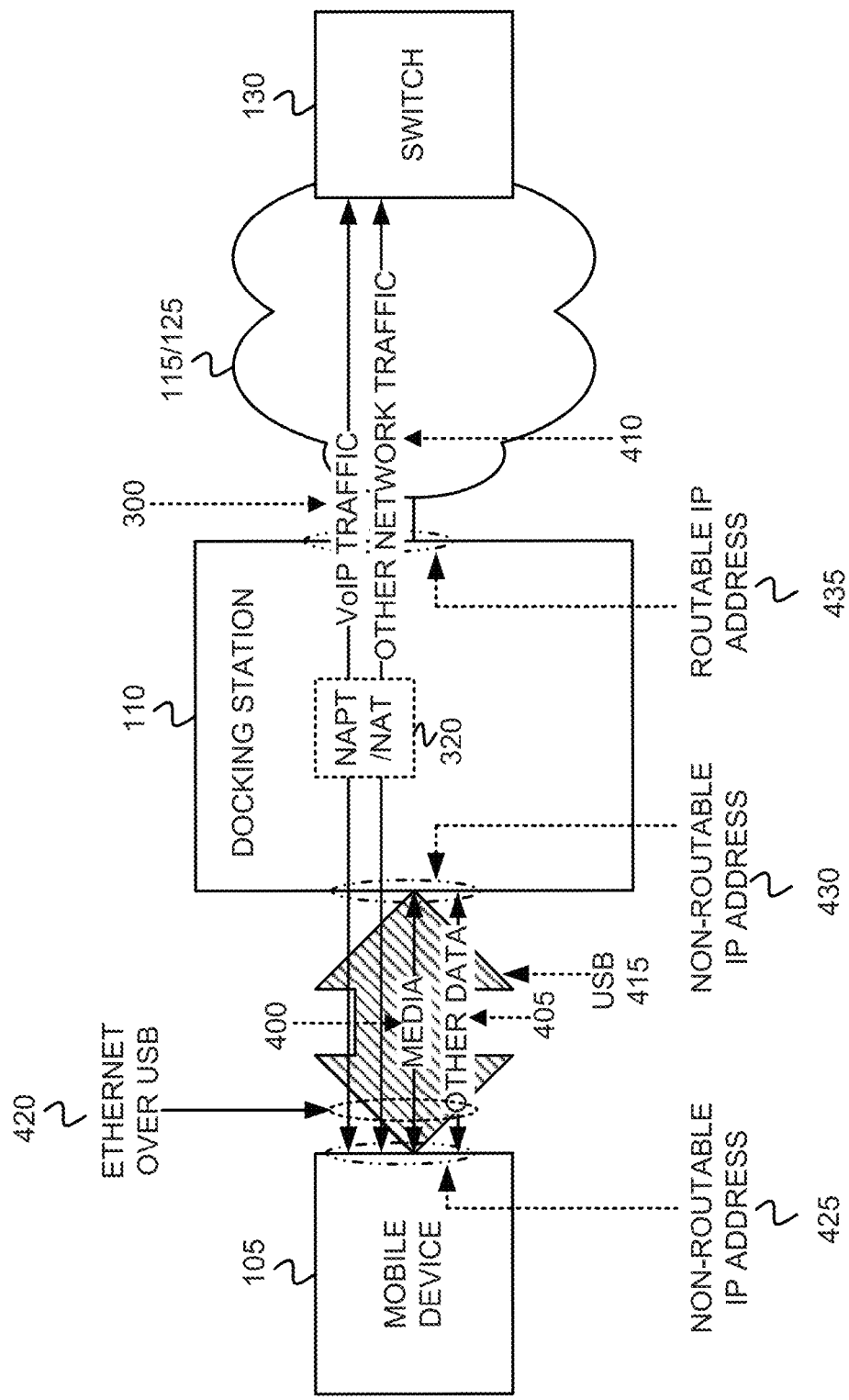
FIG. 4 is a diagram that depicts an exemplary implementation of the docking station of FIG. 1A in which the docking station implements Network Address and Port Translation or Network Address Translation for establishing a VoIP connection between a mobile device and a data network.

FIG. 4 is a diagram that depicts an exemplary implementation of docking station 110 of FIG. 1A in which docking station 110 implements NAPT or NAT for establishing a VoIP connection between mobile device 105 and data network 115. When mobile device 105 is docked into docking station 110, media 400, other data 405, VoIP traffic 300 and other network traffic 410 may be sent to and from mobile device 105 via a Universal Serial Bus (USB) 415, as further shown in FIG. 4. Mobile device 105, therefore, acts as a USB peripheral, and docking station 110 acts as a USB host. Ethernet over USB protocol 420 may be used as the physical and layer 2 connection between docking station 110 and mobile device 105. Other communication protocols, such as, for example, Serial Line Internet Protocol (SLIP), may be used for communicating between mobile device 105 and docking station 110.

As shown in FIG. 4, mobile device 105 may have statically configured IP addresses 425 that are non-routable from network 115 (but routable between IP address 430 of docking station 110 and IP addresses 425 of mobile device 105). As further shown in FIG. 4, docking station 110 may also have a statically configured IP address 430 that is non-routable from network 115 (but routable between IP address 430 of docking station 110 and IP addresses 425 of mobile device 105), where IP address 430 resides on a same private network (not shown) on which IP addresses 425 of mobile device 105 reside. A private network (not shown in FIG. 4), therefore, exists between mobile device 105 and docking station 110 via USB 415.

As further shown in FIG. 4, docking station 110 may have an IP address 435 that is routable from data network 115. Routable IP address 435 may be statically configured, or may be obtained via the DHCP protocol from data network 115. Docking station 110 may, therefore, act as a DHCP server to mobile device 105, thereby obtaining routable IP address 435 that may be used by data network 115 to forward VoIP traffic 300 and other network traffic 410 to mobile device 105 via NAPT/NAT system 320. Non-routable, private IP addresses 425 on mobile device 105 and non-routable, private IP address 430 on docking station 110 may be statically configured prior to the connection of mobile device 105 to docking station 110 via USB 415. By having a routable IP address 435 on data network 115, a network administrator may manage docking station 110 including, for example, providing software upgrades, firewall management, etc. The ability to address docking station 110 from data network 115 may not be available when docking station 110 acts as an IP bridge (e.g., the exemplary bridging implementation of FIG. 5).

Media 400 may include audio or video data (e.g., streaming audio or video) that may be streamed from mobile device 105 for playback on docking station 110, or that may be streamed from docking station 110 for playback on mobile device 105. Media 400 may be streamed from mobile device 105 IP addresses 425 to docking station IP address 430, or from docking station IP address 430 to mobile device 105 IP addresses 425. Other data 405 may include keypad information (e.g., indications of keypad presses on docking station 110), status information (e.g., voicemail message indicator light, etc.), and other information that may be exchanged between mobile phone IP addresses 425 and docking station 110 IP address 430. Other data 405 may further include data other than audio or video data, such as, for example, web traffic data. The transfer of media 400 and/or other data 405 may be through sockets, such as Transmission Control Protocol (TCP) or User Datagram Protocol (UDP) sockets.

VoIP traffic 300 may include VoIP signaling traffic (e.g., Session Initiation Protocol (SIP) traffic) and VoIP media traffic (e.g., Real-time Transport Protocol (RTP) or RTP Control Protocol (RTCP)) and may be forwarded through docking station 110 via NAPT/NAT system 320. NAPT/NAT system 320 may implement a forwarding table that forwards packets to/from mobile device 105 through docking station 110 to routable data network 115. For VoIP applications, the forwarding table may be configured to pass SIP and RTP or RTCP traffic to/from mobile device 105 to routable data network 115. Additionally, other network traffic 410 may be forwarded to/from mobile device 105 through docking station 110 to routable data network 115 by the forwarding table based on NAPT or NAT filtering. Other network traffic 410 may include Internet traffic (e.g., web browsing), etc. NAPT/

NAT system 320 may receive packets from IP addresses 425 of mobile device 105 sent to routable IP address 435 of docking station 110, and may forward the packets, using the forwarding table, to an appropriate next hop IP address in data network 115 (e.g., to a next hop switch). NAPT/NAT system 320 may further receive packets from an IP address in data network 115 sent to routable IP address 435, and may forward the packets, using the forwarding table, to non-routable IP addresses 425 of mobile device 105. A network administrator of data network 115 may designate what kinds of traffic are permissible, and the forwarding table at docking station 110 may be configured appropriately (e.g., e-mail and web browsing may be forwarded whereas other undesirable traffic may be blocked during the forwarding process). A forwarding table implemented at mobile device 105 may use routable IP address 435 of docking station 110 as the default gateway address for all outgoing packets.

Figure 5:
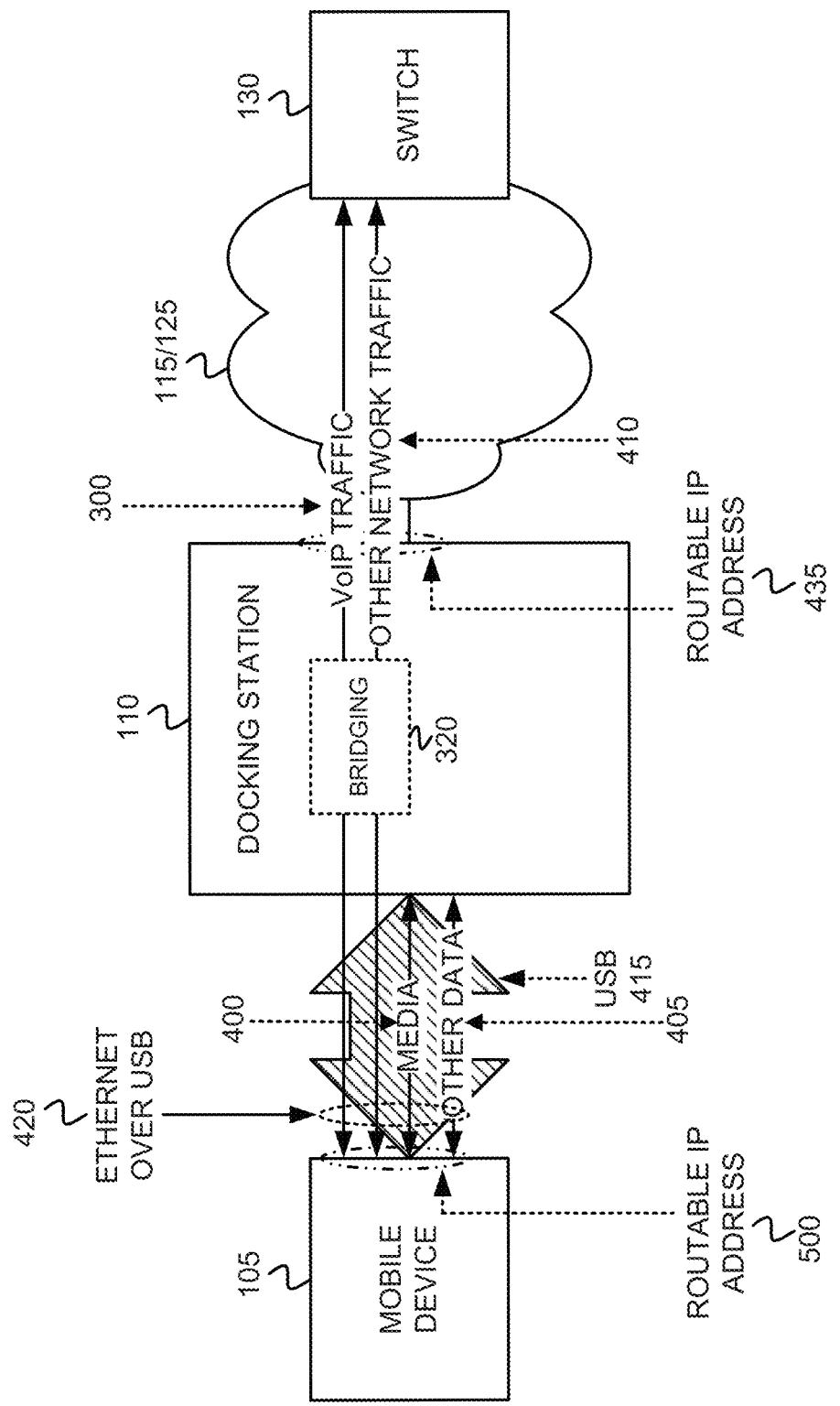
FIG. 5 is a diagram that depicts an exemplary implementation of the docking station of FIG. 1A in which the docking station implements a bridging mode for establishing a VoIP connection between the mobile device and a data network.

FIG. 5 is a diagram that depicts an exemplary implementation of docking station 110 of FIG. 1A in which docking station 110 implements a bridging mode for establishing a VoIP connection between mobile device 105 and data network 115. When mobile device 105 is docked into docking station 110, as shown in FIG. 1A, media 400, other data 405, VoIP traffic 300 and other network traffic 410 may be sent to and from mobile device 105 via a Universal Serial Bus (USB) 415, as further shown in FIG. 5. Mobile device 105, therefore, acts as a USB peripheral, and docking station 110 acts as a USB host. Ethernet over USB protocol 420 may be used as the physical and layer 2 connection between docking station 110 and mobile device 105.

As shown in FIG. 5, mobile device 105 may have multiple IP addresses 500 that are routable from data network 115. As further shown in FIG. 5, docking station 110 may also have an IP address 435 that is routable from data network 115. Routable IP addresses 500 and 435 may be statically configured, or may be obtained via the DHCP protocol from data network 115. Docking station 110 may, therefore, act as a DHCP server to mobile device 105, thereby obtaining routable IP addresses 500 and 435 that may be used by data network 115 to forward VoIP traffic 300 and other network traffic 410 to mobile device 105 via bridging system 320.

Media 400 may be streamed from mobile device 105 for playback on docking station 110, or may be streamed from docking station 110 for playback on mobile device 105. Media 400 may be streamed from mobile device 105 IP addresses 500 to docking station IP address 435, or from docking station IP address 435 to mobile device 105 IP addresses 500. Other data 405 may include keypad information, status information, and other information that may be exchanged between mobile device IP address 500 and docking station 110 IP address 435.

VoIP traffic 300 may include VoIP signaling traffic (e.g., SIP traffic) and VoIP media traffic (e.g., RTP or RTCP) and may be forwarded through docking station 110 via bridging system 320. Bridging system 320 may forward, at layer 2, packets to/from mobile device 105 through docking station 110 to routable data network 115. Bridging system 320 may "transparently" forward packets, without any NAPT or NAT filtering as performed in the implementation of FIG. 4, from mobile device 105 to data network 115 and from data network 115 to mobile device 105. For example, if data network 115 includes an Ethernet Local Area Network (LAN), bridging system 320 may forward Ethernet frames from data network 115 to mobile device 105 based on MAC addresses contained in the Ethernet frames.

Figure 6:
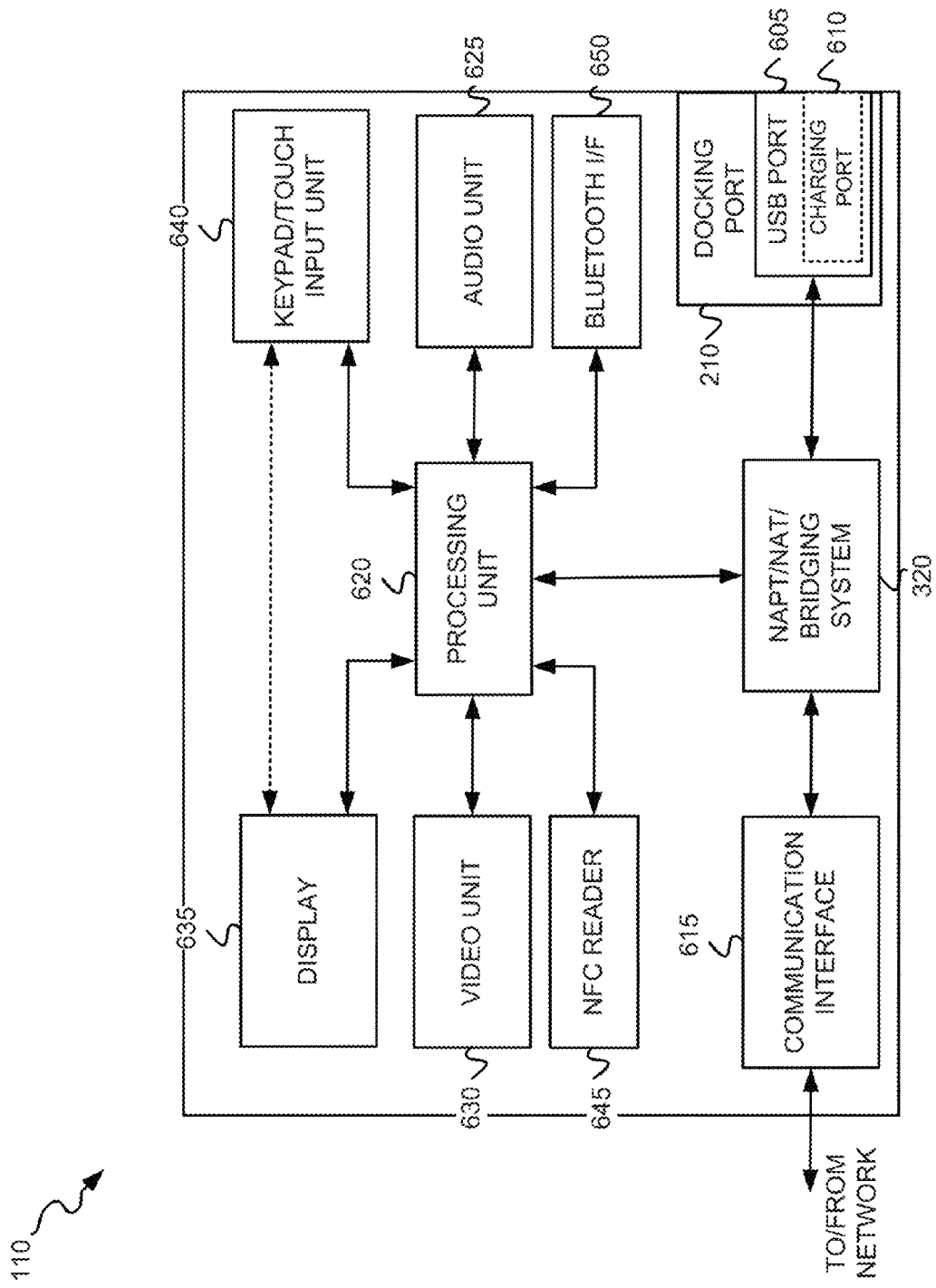
FIG. 6 is a diagram that depicts exemplary components of the docking station of FIG. 1A.

FIG. 6 is a diagram that depicts exemplary components of docking station 110. Docking station 110 may include docking port 210, NAPT/NAT/Bridging system 320, a communication interface 615, a processing unit 620, an audio unit 625, a video unit 630, a display 635, a keypad/touch input 640, a Near Field Communication (NFC) reader 645, and a Bluetooth interface 650.

Docking port 210 may include a port that may physically engage with a tray into which mobile device 105 is inserted. As described with respect to FIGS. 2A and 2B, the shape and size of docking port 210 may be different based on a different external configuration of mobile device 105. Docking port 210 may further include a USB port 605, which also includes a charging port 610 (i.e., USB port 605 may simultaneously act as a data port and a battery charging port). Though a single USB port 605 is depicted in FIG. 6, docking station 110 may include multiple USB ports (not shown) and/or a USB hub. Charging port 610 may include an electrical connection for supplying a charging current to a battery of mobile device 105. USB port 605 may include an electrical connection for the USB that may interconnect docking station 110 with mobile device 105 (e.g., via mobile device tray 200).

NAPT/NAT/bridging system 320 may include, in one exemplary implementation that corresponds to FIG. 4 above, a system on a chip (SOC) that implements NAPT or NAT which modifies network address information in incoming packets for the purpose of translating one IP address space into another (e.g., remaps routable public IP addresses into private, non-routable IP addresses). NAPT/NAT/bridging system 320, when implementing NAPT or NAT, may be used to firewall and control traffic sent to mobile device 105 via docking station 110, thus, enhancing the security of, and control over, traffic carried by the docked mobile device 105. NAPT/NAT/bridging system 320 may include, in another exemplary implementation that corresponds to FIG. 5 above, a SOC that implements a bridging mode which may forward packets, at layer 2, from data network 115, though docking station 110, to mobile device 105. Additionally, the SOC implementing the bridging mode may forward packets, at layer 2, from mobile device 105, though docking station 110, to data network 115.

Communication interface 615 may include a transceiver for communicating with data network 115. Processing unit 620 may include a processor, microprocessor, or processing logic that may interpret and execute instructions. The instructions may be stored in memory (not shown), such as, for example, a random access memory (RAM), a Read Only Memory (ROM), or another type of dynamic or static storage device that may store information and instructions for execution by processing unit 620.

Audio unit 625 may include a microphone for receiving audio input into docking station 110, and may include mechanisms for playback of audio data received from the microphone, or received from mobile device 105. Video unit 630 may include a camera for capturing video, and may further include mechanisms for playback of video data received from the camera, or received from mobile device 105. Display 635 may include a display device that may display video data or other types of data associated with the operation of docking station 110 or mobile device 105. In some implementations, display 635 may include a touch screen display that registers touch input at different locations upon the touch screen. Keypad/touch input unit 640 may include an alphanumeric keypad and mechanisms for receiving indications of touch input from display 635.

NFC reader 645 may include a short range, high frequency system that enables the short range (e.g., 10 cm) exchange of data with mobile device 105. When mobile device 105 is placed in proximity to docking station 110 (e.g., device 105 is inserted into docking port 210), NFC reader 645 may "read" phone identity information from a corresponding NFC system located in device 105. In addition to phone identity information, NFC reader 645 may also read phone user identity information from the corresponding NFC system located in device 105. NFC reader 645 may, thus, be used to identify different phones that may be placed in proximity to docking station 110. Bluetooth interface 650 may include a short wavelength system for connecting with, and exchanging data over short distances, with any type of Bluetooth enabled device. Bluetooth interface 650 may, for example, connect with a Bluetooth enabled audio headset that permits a wearer to listen to audio from audio unit 625.

The configuration of components of docking station 110 illustrated in FIG. 6 is for illustrative purposes only. Other configurations may be implemented. Therefore, docking station 110 may include additional, fewer and/or different components than those depicted in FIG. 6. For example, docking station 110 may include a magnetic sensor that may detect the insertion of mobile device 105 into docking port 210 and may thereby initiate various functions at docking station 110 or at mobile device 105 (e.g., initiate execution of VoIP client 140 at mobile device 105, etc.).

Figure 7:
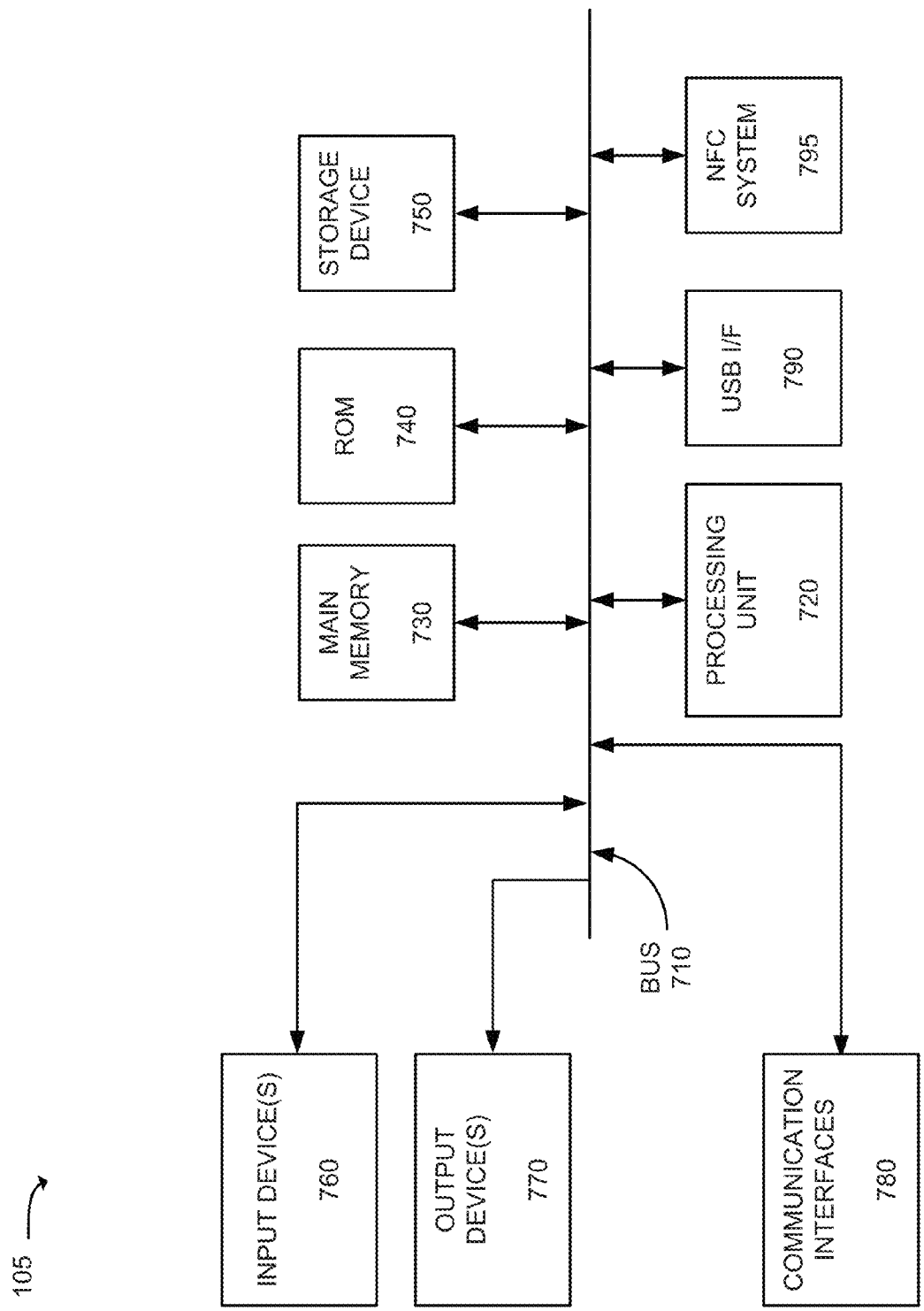
FIG. 7 is a diagram that depicts exemplary components of the mobile device of FIG. 1A.

FIG. 7 is a diagram that depicts exemplary components of mobile device 105. Switch 130 and/or mobility server 135 may be similarly configured. Mobile device 105 may include a bus 710, a processing unit 720, a main memory 730, a read only memory (ROM) 740, a storage device 750, an input device(s) 760, an output device(s) 770, a communication interface 780, a USB interface 790, and a NFC system 795. Bus 710 may include a path that permits communication among the elements of mobile device 105.

Processing unit 720 may include a processor, microprocessor, or processing logic that may interpret and execute instructions. Main memory 730 may include a random access memory (RAM) or another type of dynamic storage device that may store information and instructions for execution by processing unit 720. ROM 740 may include a ROM device or another type of static storage device that may store static information and instructions for use by processing unit 720. Storage device 750 may include a magnetic and/or optical recording medium.

Input device 760 may include one or more mechanisms that permit an operator to input information to mobile device 105, such as, for example, a keypad or a keyboard, voice recognition and/or biometric mechanisms, etc. Output device 770 may include one or more mechanisms that output information to the operator, including a display, a speaker, etc. Communication interface 780 may include any transceiver mechanism that enables mobile device 105 to communicate with other devices and/or systems. For example, communication interface 780 may include a radio frequency transceiver for communicating via wireless network 120. USB I/F 790 may include interconnection mechanisms to permit mobile device 105 to physically and electrically connect with USB port 605 of docking station 110. NFC system 795 may include a short range, high frequency system that enables the short range exchange of data with mobile device 105. When mobile device 105 is placed in proximity to docking station 110 (e.g., device 105 is inserted into docking port 210), NFC system 795 may transmit phone identity information and/or phone user identity information that may be "read" by NFC reader 645 of docking station 110.

The configuration of components of mobile device 105 illustrated in FIG. 7 is for illustrative purposes only. Other configurations may be implemented. Therefore, mobile device 105 may include additional, fewer and/or different components than those depicted in FIG. 7. For example, mobile device 105 may include a GPS unit that may be used for determining a location of mobile device 105.

Figure 8:
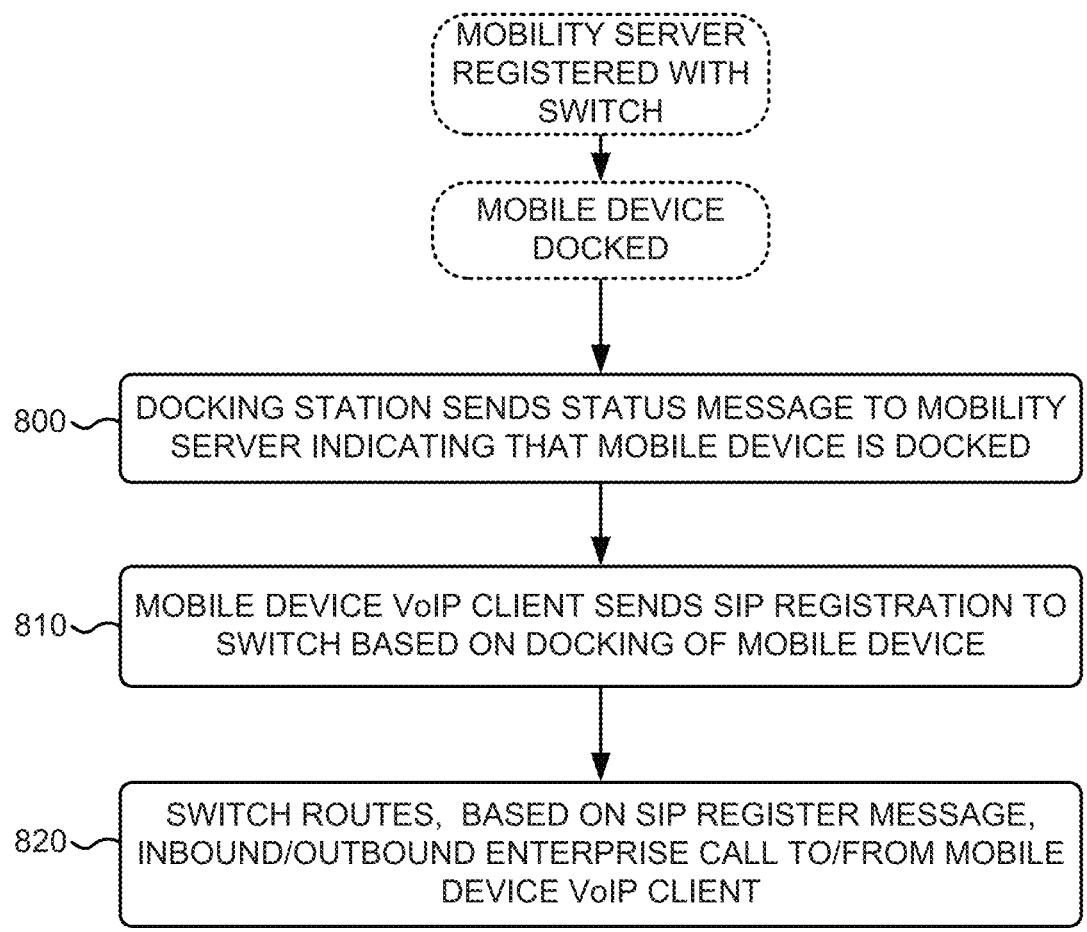
FIG. 8 is a flow diagram that illustrates an exemplary process for handling inbound or outbound enterprise calls to or from a docked mobile device of FIG. 1A.
Figure 9:
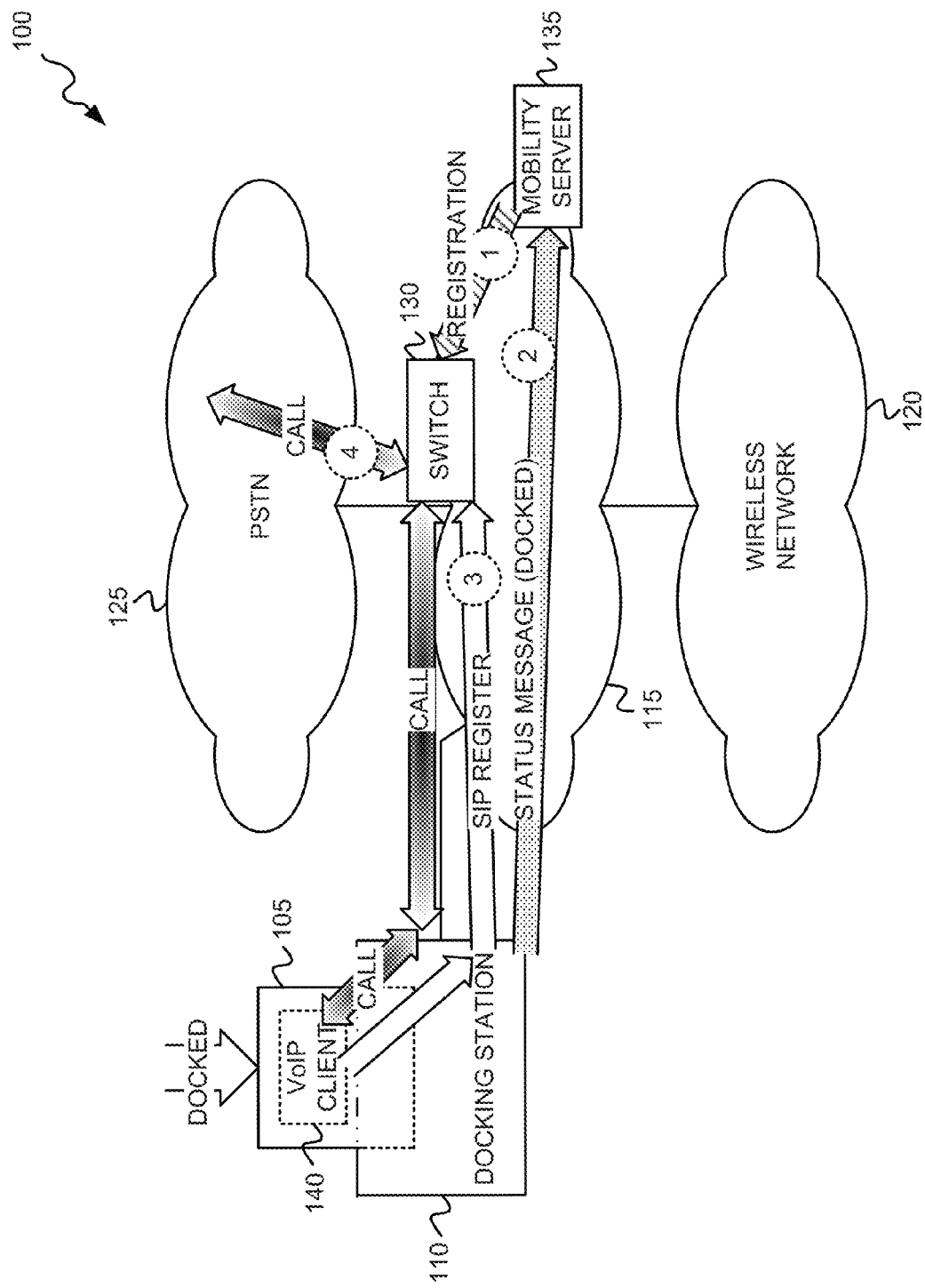
FIG. 9 is a diagram that illustrates the implementation of the exemplary process of FIG. 8 within the network environment of FIG. 1A.
Figure 10:
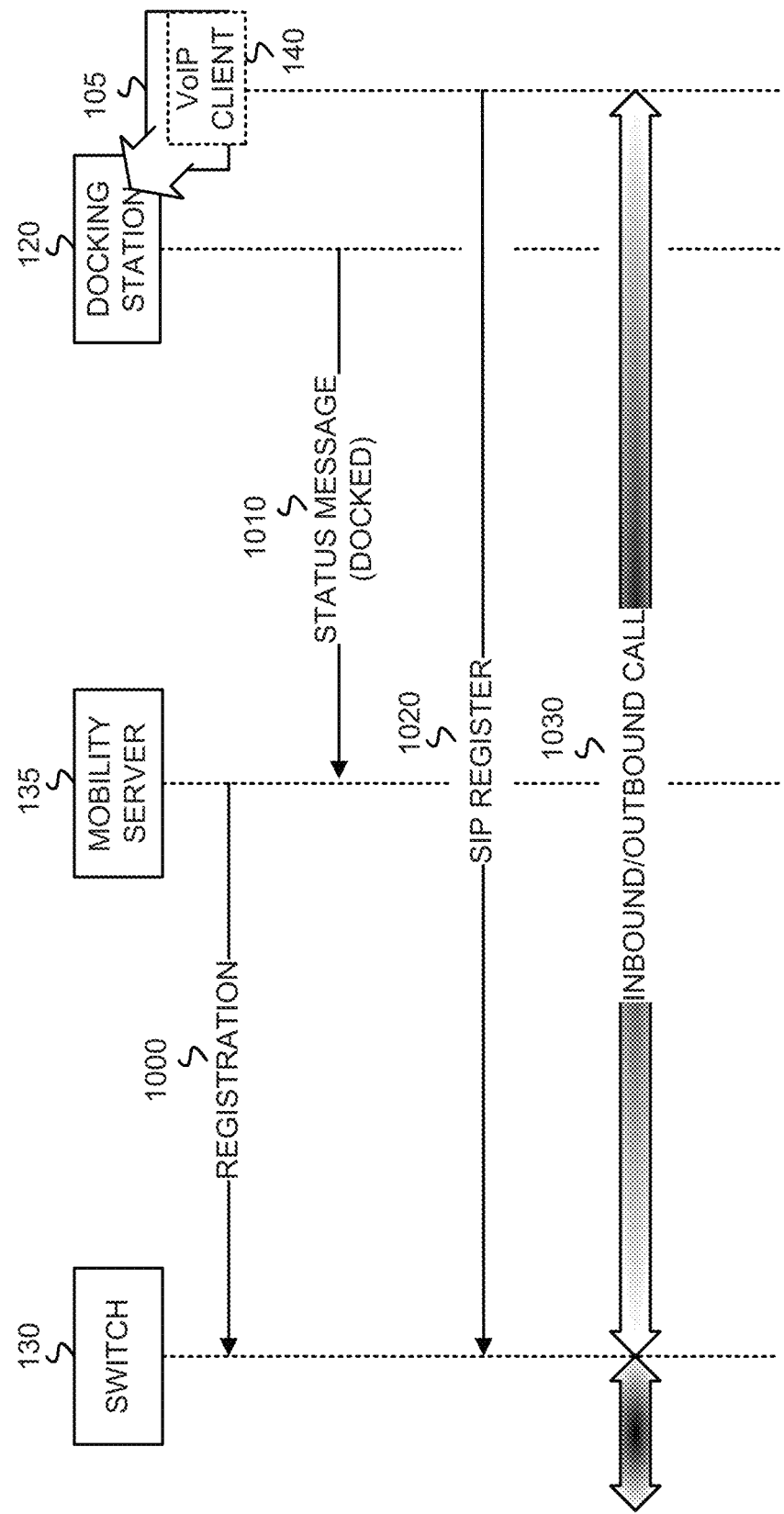
FIG. 10 is a diagram that depicts exemplary messaging associated with the exemplary process of FIG. 8.

FIG. 8 is a flow diagram that illustrates an exemplary process for handling inbound or outbound enterprise calls to or from mobile device 105 when mobile device 105 is docked with docking station 110. The exemplary process of FIG. 8 may be implemented by docking station 110, mobile device 105 and switch 130. The exemplary process of FIG. 8 is described below with reference to FIGS. 9 and 10. Prior to executing the exemplary process of FIG. 8, mobility server 135 may have registered with switch 130, and mobile device 105 may have docked with docking station 110. For example, as shown in FIGS. 9 and 10, mobility server 135 may send a registration message 1000 (identified with a "1" in FIG. 9) to switch 130 to register mobility server 135 with switch 130 on behalf of mobile device 105.

The exemplary process may include docking station 110 sending a status message to mobility server 135 indicating that mobile device 105 is docked (block 800). Docking station 110 may send the status message periodically, or at the time that mobile device 105 is docked with docking station 110. The status message may additionally specify whether mobile device 105 is engaged in an active call. FIGS. 9 and 10 depict docking station 110 sending a status message 1010 (identified with a "2" in FIG. 9) to mobility server 135.

VoIP client 140 at mobile device 105 sends a SIP registration message to switch 130 (block 810). The SIP message may include a SIP register message that informs switch 130 of VoIP client 140's current IP address and the Uniform Resource Locator(s) (URL(s)) for which VoIP client 140 at mobile device 105 may receive calls. FIGS. 9 and 10 show VoIP client 140 sending a SIP register 1020 message (identified with a "3" in FIG. 9) to switch 130. Switch 130 routes inbound/outbound enterprise calls, based on the SIP register message 1020 received from VOIP client 140, to/from VoIP client 140 of mobile device 105 (block 820). FIGS. 9 and 10 depict switch 130 routing a call (identified with a "4" in FIG. 9, and shown in FIG. 10 as call 1030) to or from VoIP client 140 at mobile device 105.

Figure 11:
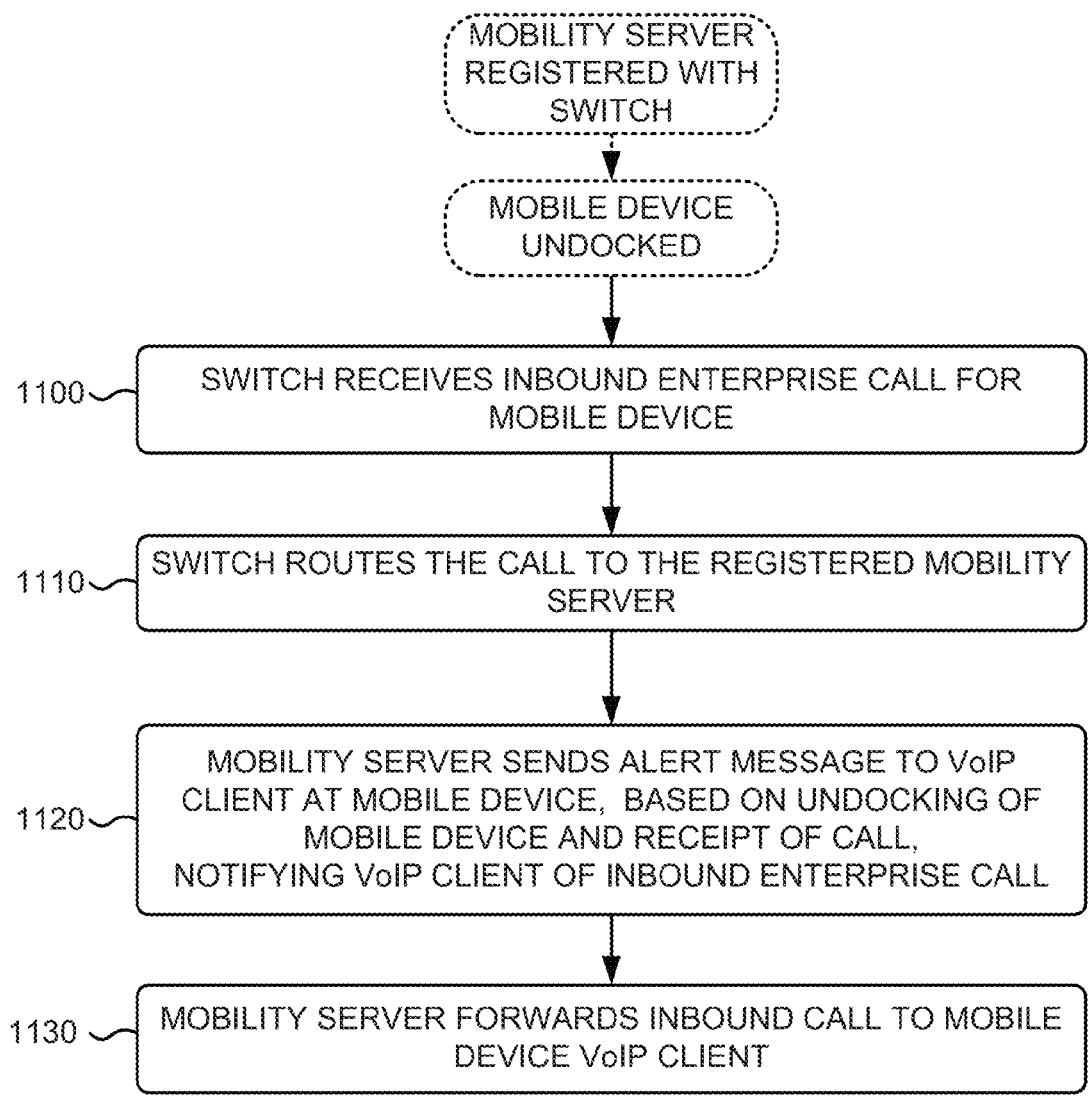
FIG. 11 is a flow diagram that illustrates an exemplary process for handling inbound enterprise calls to an undocked mobile device.
Figure 12:
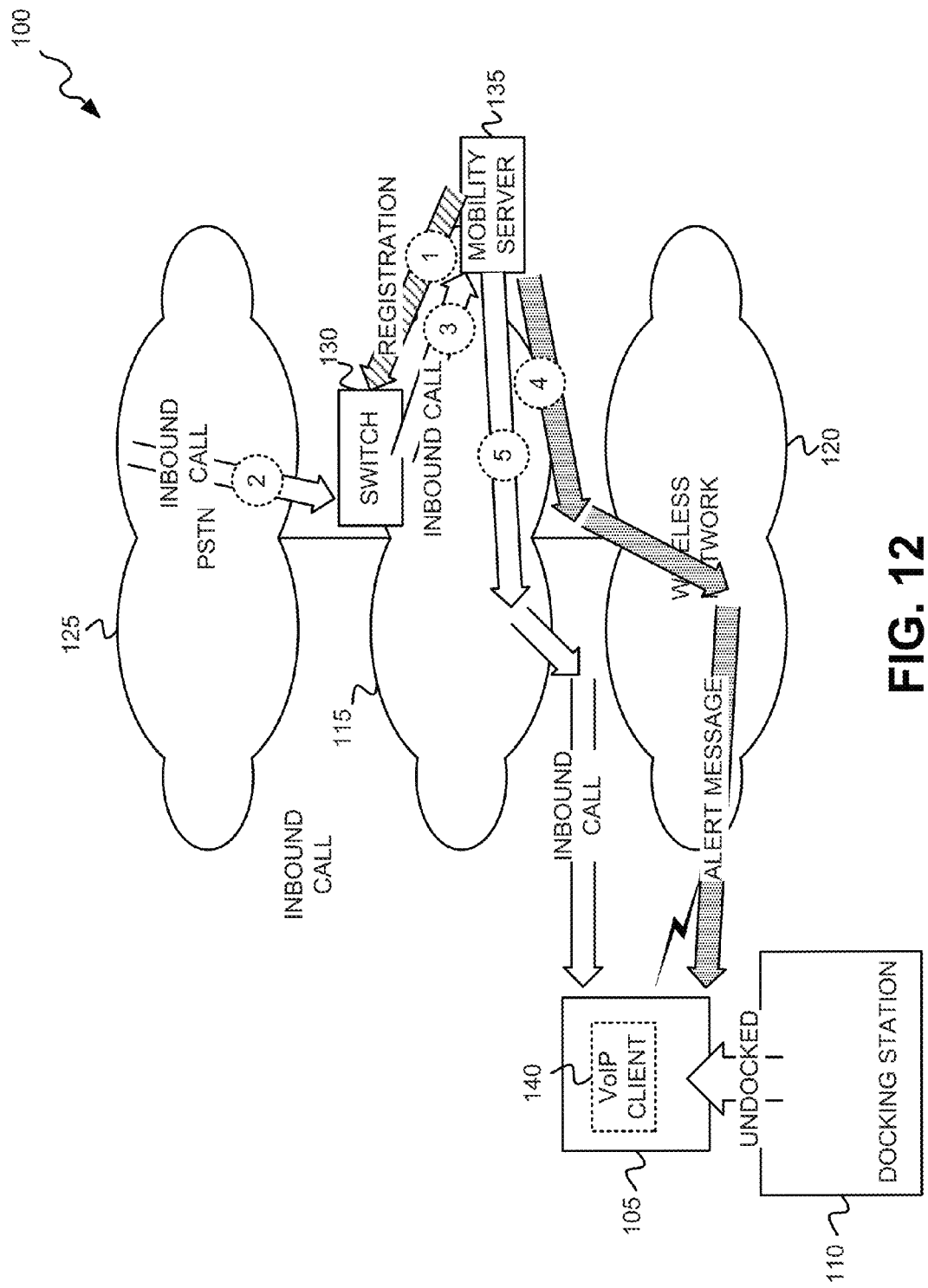
FIG. 12 is a diagram that illustrates the implementation of the exemplary process of FIG. 11 within the network environment of FIG. 1A.
Figure 13:
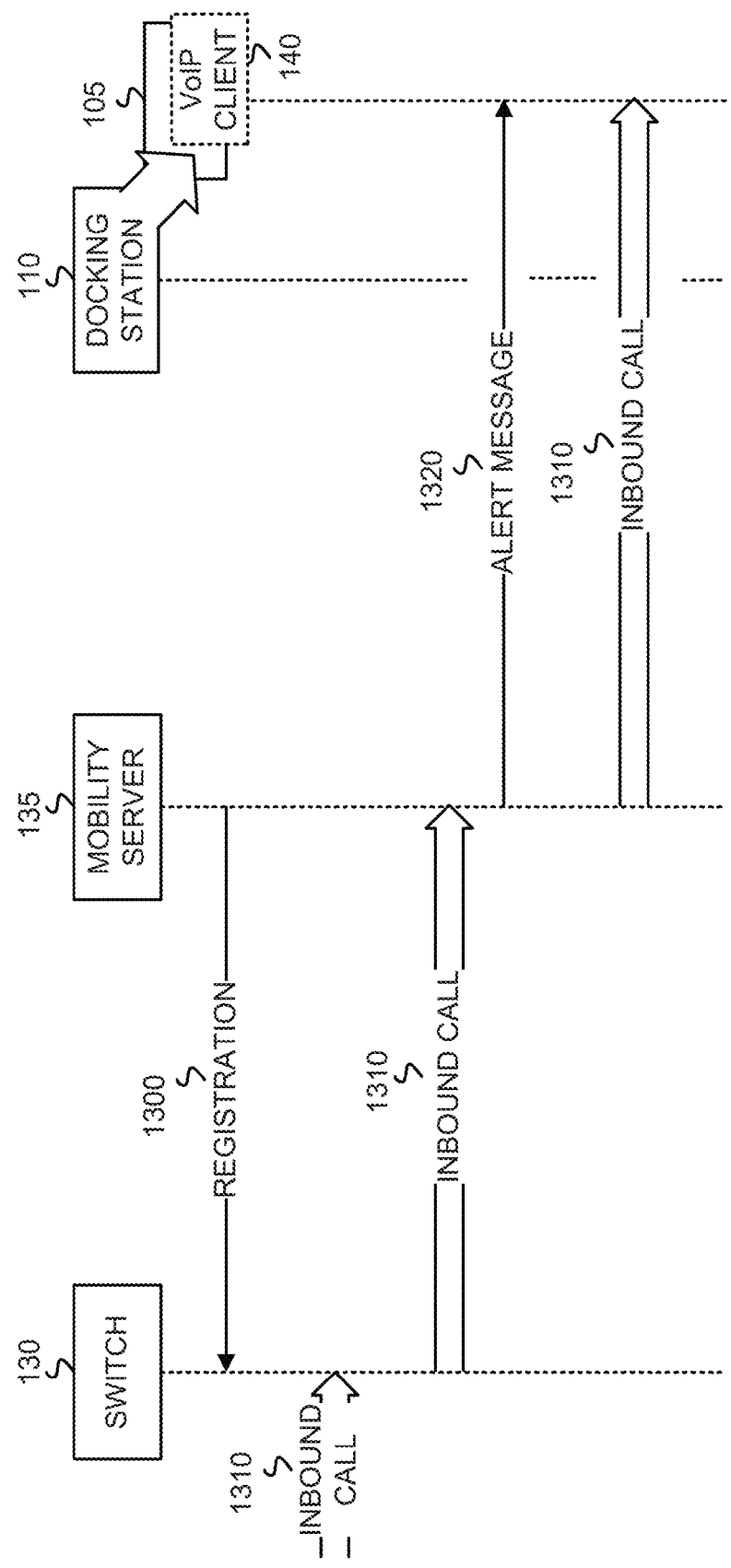
FIG. 13 is a diagram that depicts exemplary messaging associated with the exemplary process of FIG. 11.

FIG. 11 is a flow diagram that illustrates an exemplary process for handling inbound enterprise calls to mobile device 105 when mobile device 105 is undocked from docking station 110. The exemplary process of FIG. 11 may be implemented by switch 130 and mobility server 135. The exemplary process of FIG. 11 is described below with reference to FIGS. 12 and 13. Prior to executing the exemplary process of FIG. 11, mobility server 135 may have registered with switch 130, and mobile device 105 may have undocked from docking station 110. For example, as shown in FIG. 13, mobility server 135 sends a registration message 1300 to switch 130 (identified with a "1" in FIG. 12) and, as further shown in FIG. 12, mobile device 105 is undocked from docking station 110.

The exemplary process may include switch 130 receiving an inbound enterprise call for the mobile device (block 1100). A telephone, or other call source, may initiate a call to the enterprise telephone number (e.g., VoIP TN) associated with VoIP client 140. As shown in FIGS. 12 and 13, switch 130 receives an inbound call 1310 (identified with a "2" in FIG. 12). Switch 130 routes the call to the registered mobility server 135 (block 1110). FIGS. 12 and 13 depict switch 130 routing inbound call 1310 (identified with a "3" in FIG. 12) to mobility server 135. Mobility server 135 sends an alert message to VoIP client 140 at mobile device 105 (block 1120), notifying VoIP client 140 of the inbound enterprise call (block 1120). FIGS. 12 and 13 show mobility server 135 sending an alert message 1320, via data network 115, to VoIP client 140 at mobile device 105 (identified with a "4" in FIG. 12). Mobility server 135 forwards the inbound call to VoIP client 140 of mobile device 105 (block 1130). FIGS. 12 and 13 depict mobility server 135 forwarding inbound call 1310 (identified with a "5" in FIG. 12), via data network 115 and wireless network 120, to VoIP client 140 at undocked mobile device 105.

Figure 14:
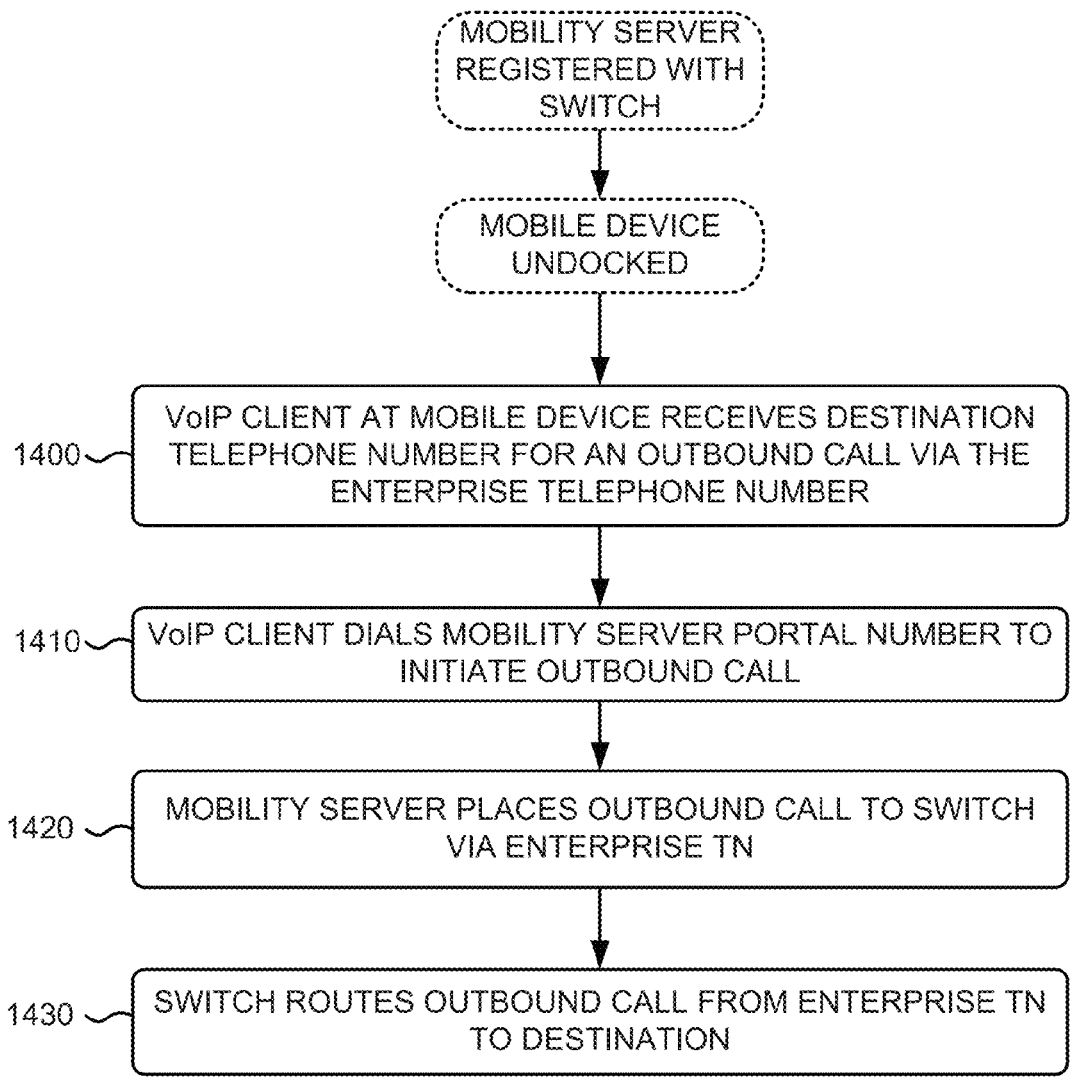
FIG. 14 is a flow diagram that illustrates an exemplary process for handling outbound calls from an undocked mobile device via the enterprise telephone number.
Figure 15:
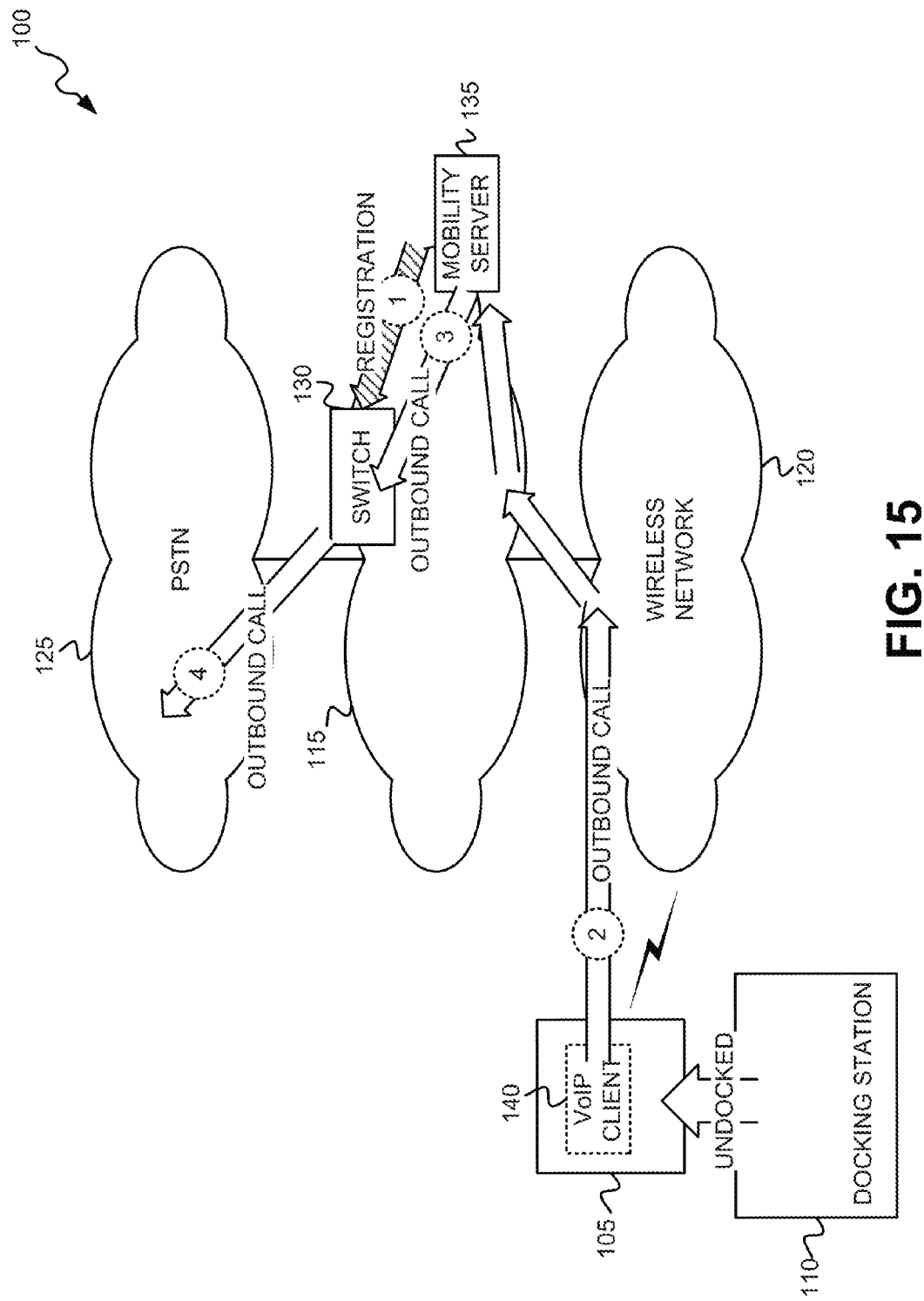
FIG. 15 is a diagram that illustrates the implementation of the exemplary process of FIG. 14 within the network environment of FIG. 1A.
Figure 16:
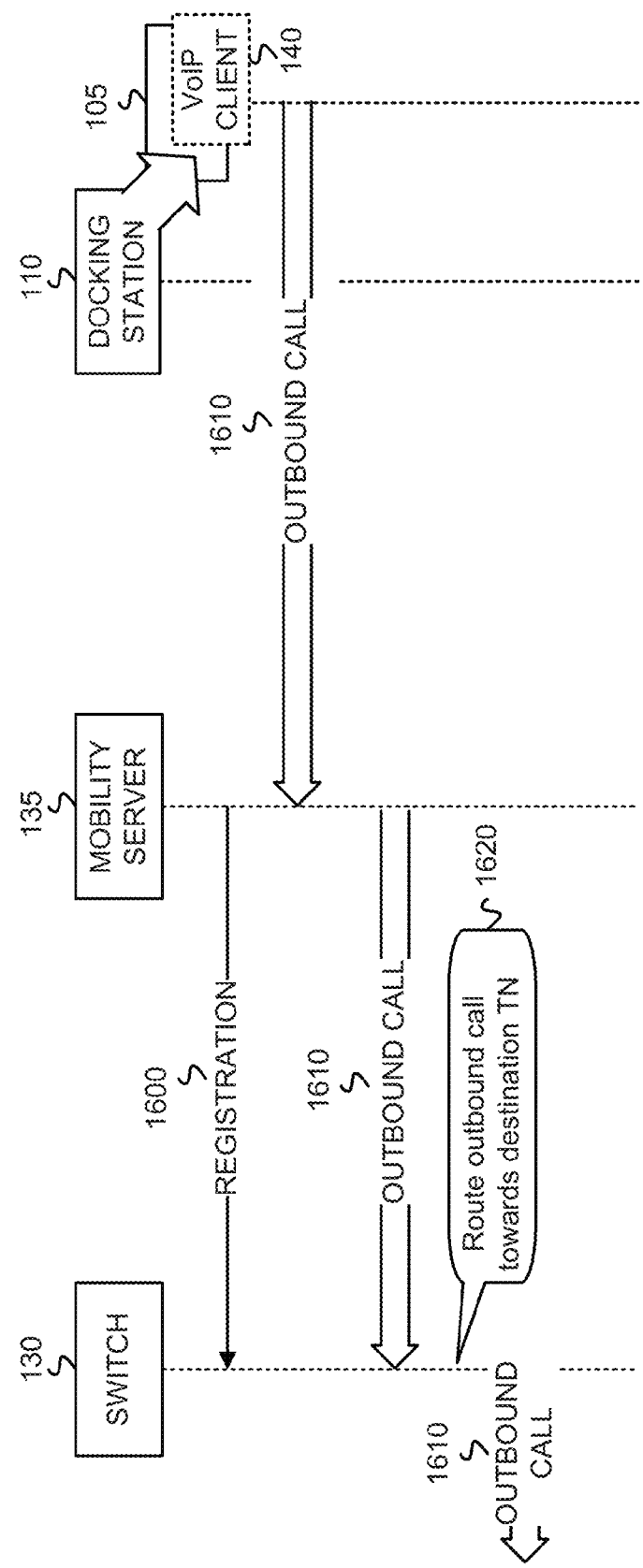
FIG. 16 is a diagram that depicts exemplary messaging associated with the exemplary process of FIG. 14.

FIG. 14 is a flow diagram that illustrates an exemplary process for handling outbound calls from mobile device 105 via an enterprise telephone number when mobile device 105 is undocked from docking station 110. The exemplary process of FIG. 14 may be implemented by switch 130 and mobility server 135. The exemplary process of FIG. 14 is described below with reference to FIGS. 15 and 16. Prior to executing the exemplary process of FIG. 14, mobility server 135 may have registered with switch 130, and mobile device 105 may have undocked from docking station 110. For example, as shown in FIG. 16, mobility server 135 sends a registration message 1600 to switch 130 (identified with a "1" in FIG. 15) and, as further shown in FIG. 15, mobile device 105 is undocked from docking station 110.

The exemplary process may include VoIP client 140 at mobile device 105 receiving a destination telephone number for an outbound call via the enterprise telephone number (block 1400). A user of mobile device 105 may, using VoIP client 140, enter, or select from a list (e.g., a contacts list), the telephone number for the call destination. VoIP client 140 at mobile device 105 may dial mobility server 135's portal number to initiate an outbound call (block 1410). FIGS. 15 and 16 depict VoIP client 140 at mobile device 105 sending an outbound call 1610 to mobility server 135 (identified with a "2" in FIG. 15). Mobility server 135 places the outbound call to switch 130 via the enterprise telephone number (block 1420). FIGS. 15 and 16 depict mobility server 135 forwarding outbound call 1610 to switch 130 (identified with a "3" in FIG. 15). Switch 130 routes the outbound call from the enterprise telephone number to the destination telephone number (block 1430). FIGS. 15 and 16 depict switch 130 routing 1620 outbound call 1610 (identified with a "4" in FIG. 15) towards a destination telephone number.

Figure 17:
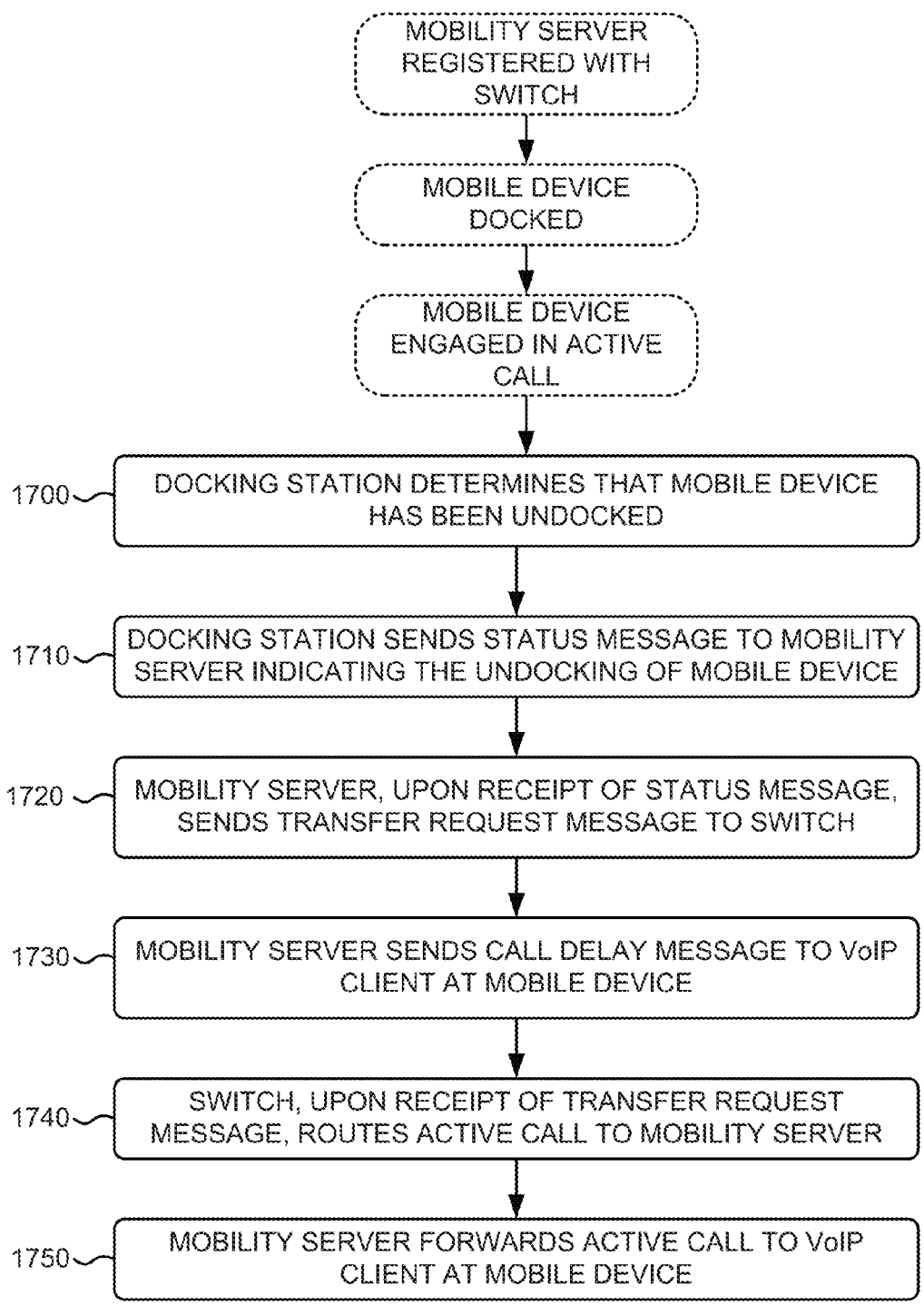
FIG. 17 is a flow diagram that illustrates an exemplary process for implementing call continuity during the undocking of mobile device from docking station during an active call.

FIG. 17 is a flow diagram that illustrates an exemplary process for implementing call continuity during the undocking of mobile device 105 from docking station 110 during an active call. The exemplary process of FIG. 17 may be implemented by docking station 110, mobility server 135 and switch 130. The exemplary process of FIG. 17 is described below with reference to FIGS. 18A, 18B and 19. Prior to executing the exemplary process of FIG. 17, mobility server 135 may have registered with switch 130, mobile device 105 may have docked with docking station 110, and mobile device 105 may be engaged in an active call. VoIP client 140 of mobile device 105 may, thus, be engaged in an active inbound or outbound call as described above with respect to FIGS. 8-10.

Figure 18A:
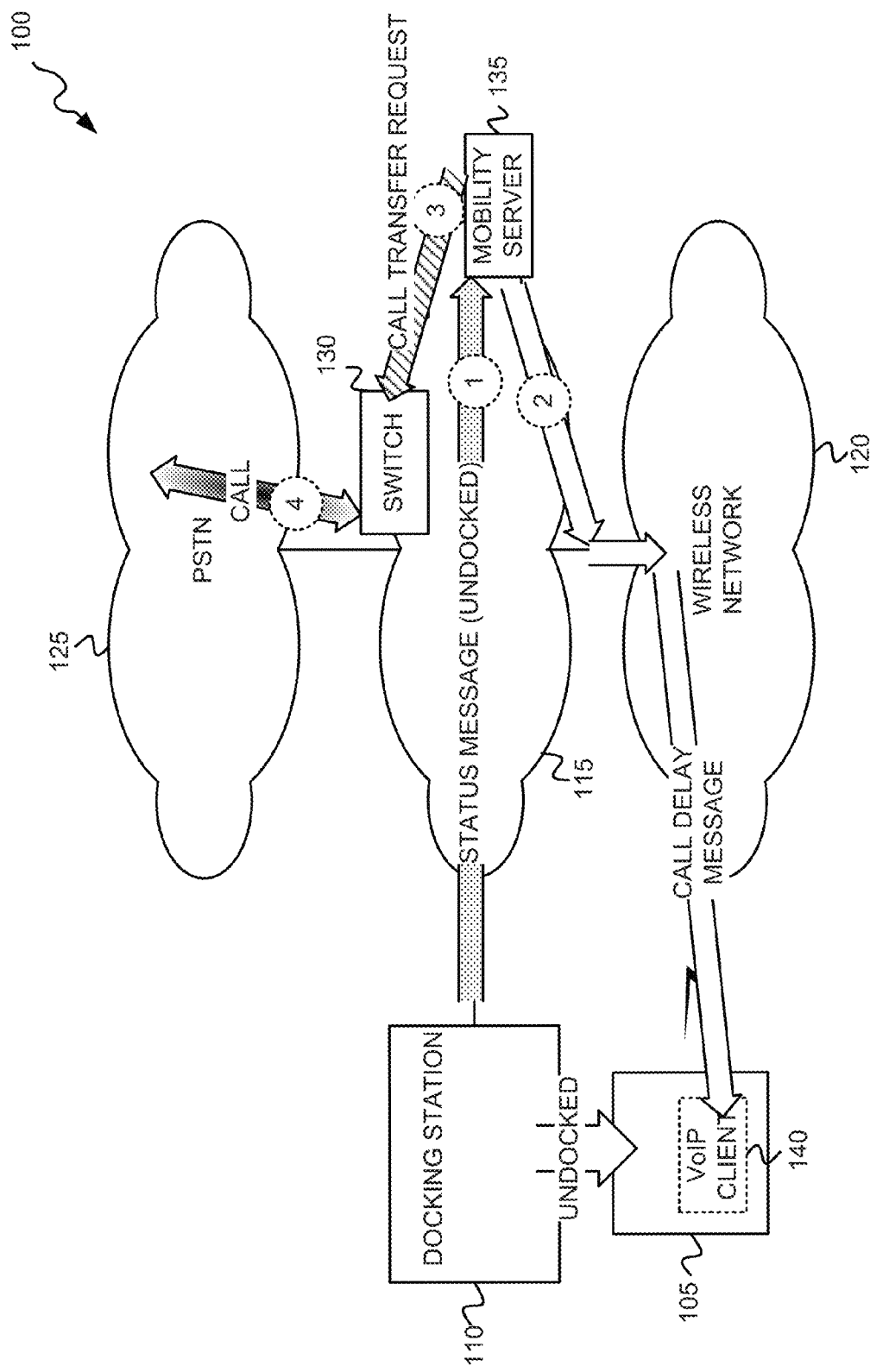
FIGS. 18A and 18B are diagrams that illustrate the implementation of the exemplary process of FIG. 17 within the network environment of FIG. 1A.
Figure 19:
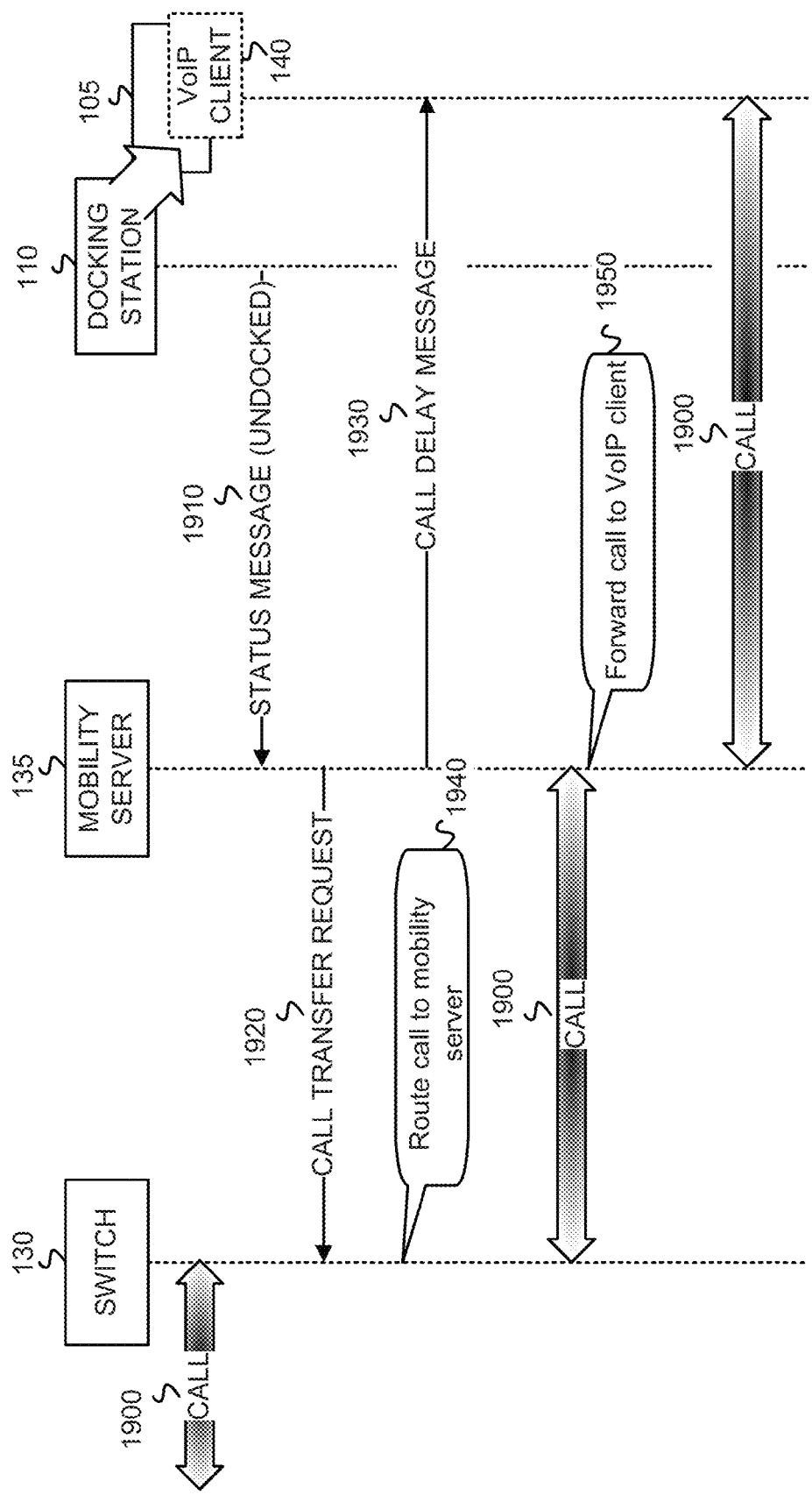
FIG. 19 is a diagram that depicts exemplary messaging associated with the exemplary process of FIG. 17.

The exemplary process may include docking station 110 determining that mobile device 105 has been undocked from docking station 110 during the active call (block 1700). FIG. 18A and 19 depict mobile device 105 being undocked from docking station 110 during an active call 1900 (identified with a "4" in FIG. 18A). Docking station 110 sends a status message to mobility server 135 indicating that mobile device 105 has been undocked (block 1710). The status message may additionally indicate that mobile device 105 is engaged in an active call. Docking station 110 may send the status message periodically, or at the time that mobile device 105 undocks from docking station 110. FIGS. 18A and 19 depict docking station 110 sending a status message 1910 (identified with a "1" in FIG. 18A) to mobility server 135 that indicates that mobile device 105 is undocked from docking station 110.

Mobility server 135, upon receipt of the status message from docking station 110, sends a transfer request message to switch 130 (block 1720) and sends a call delay message to VoIP client 140 at mobile device 105 (block 1730). The call delay message indicates that the active call will be temporarily interrupted while the network re-routes the call via mobility server 135. FIGS. 18A and 19 depict mobility server 135 sending a call transfer request 1920 (identified with a "3" in FIG. 18A) to switch 130, and sending a call delay message 1930 (identified with a "2" in FIG. 18A) to VoIP client 140 at mobile device 105.

Figure 18B:
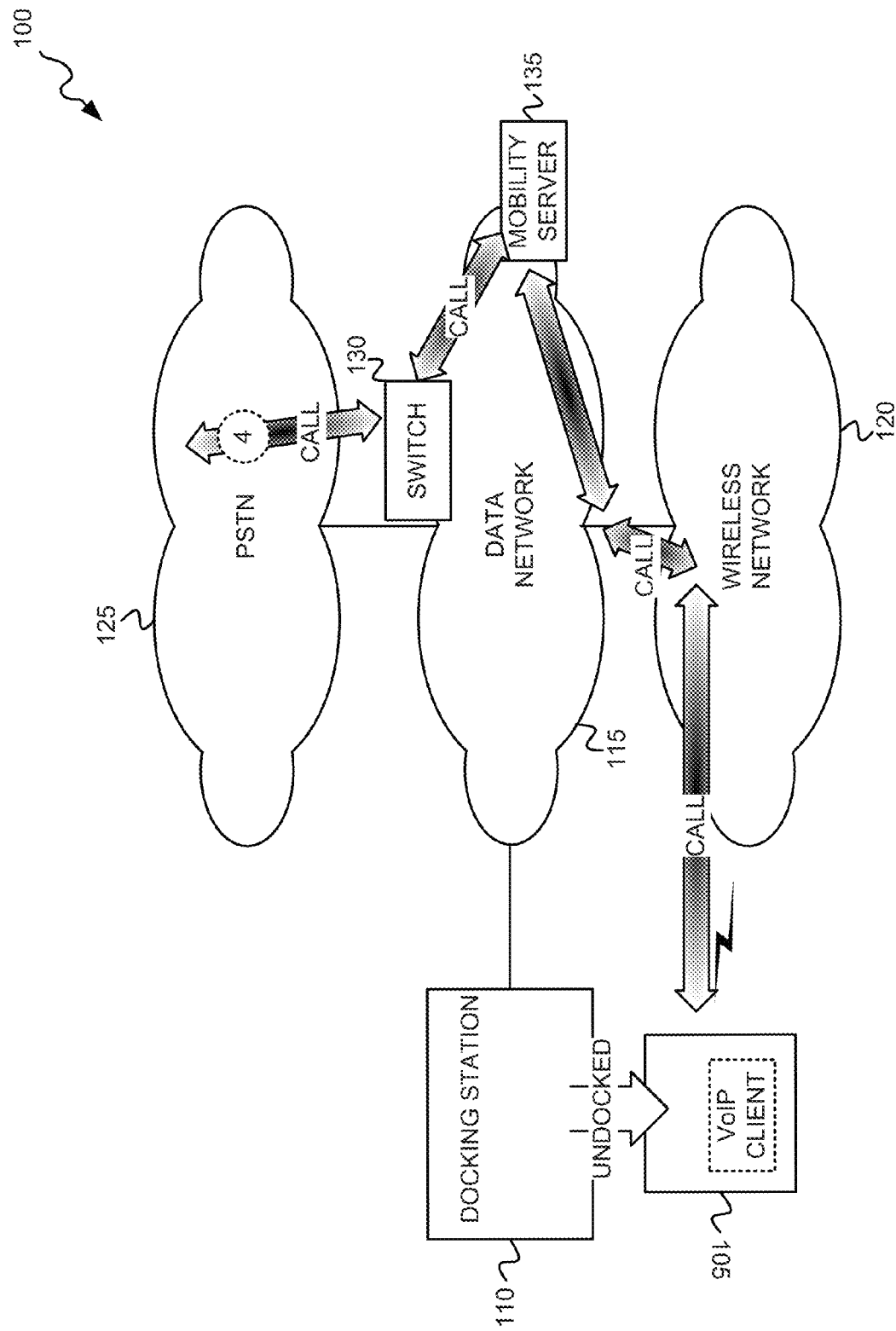

Switch 130, upon receipt of the transfer request message, routes the active call to mobility server 135 (block 1740). FIGS. 18B and 19 depict switch 130 routing 1940 active call 1900 (identified with a "4" in FIG. 18B) to mobility server 135. Mobility server 135 forwards the active call to VoIP client 140 at mobile device 105 (block 1750). To forward the active call, mobility server 135 may dial the mobile TN of mobile device 105 in wireless network 120. FIGS. 18B and 19 depict mobility server 135 forwarding 1950 active call 1900 to VoIP client 140 at mobile device 105 via data network 115 and wireless network 120.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 8, 11, 14, and 17, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
   determining if a mobile device is undocked from a docking station while a Voice over Internet Protocol (VoIP) client application at the mobile device is engaged in an active VoIP voice call via a VoIP telephone number associated with the mobile device;
   sending, from a network mobility device, a call delay message to the VoIP client application at the mobile device if the mobile device is undocked from the docking station while the mobile device is engaged in the active VoIP voice call, wherein the call delay message notifies the mobile device of a temporary interruption in the active VoIP voice call;

sending, from the network mobility device, a call transfer request message to a switch connected to a telephone network handling the active VoIP voice call;

receiving, at the network mobility device, the active VoIP voice call that has been routed from the switch; and forwarding, from the network mobility device via a wireless network, the active VoIP voice call to the VoIP client application at the mobile device, wherein forwarding the active VoIP voice call comprises:

dialing a mobile telephone number of the mobile device in the wireless network, wherein the mobile telephone number is different than the VoIP telephone number.

2. The method of claim 1, wherein the active VoIP voice call is forwarded from the network mobility device to the VoIP client application via a data network and the wireless network.

3. The method of claim 1, further comprising:
registering the network mobility device with the switch connected to the telephone network.

4. The method of claim 1, further comprising:
receiving, at the network mobility device, a status message from the docking station indicating that the mobile device has undocked from the docking station,
wherein determining if the mobile device is undocked from the docking station while engaged in the active VoIP voice call is based on the received status message.

5. The method of claim 1, wherein the switch comprises a Public Branch Exchange (PBX) and the telephone network comprises a Public Switched Telephone Network (PSTN).

6. The method of claim 1, wherein the docking station comprises a Voice over Internet Protocol (VoIP) phone that has a wired connection to the data network and has a docking port for docking the mobile device and wherein the mobile device comprises a portable digital computing device that has the capability to communicate via multiple different types of network connections.

7. The method of claim 6, wherein the portable digital computing device comprises a cellular telephone, a tablet computer, or a personal digital assistant (PDA).

8. A network mobility device, comprising:
a communication interface connected to a data network; and
a processing unit configured to:
determine if a mobile device is undocked from a docking station while a Voice over Internet Protocol (VoIP) client at the mobile device is engaged in an active VoIP voice call via a VoIP telephone number associated with the mobile device;
send, via the communication interface, a call delay message to the VoIP client application at the mobile device if the mobile device is undocked from the docking station while the mobile device is engaged in the active VoIP voice call via the VoIP telephone number, wherein the call delay message notifies the mobile device of a temporary interruption in the active VoIP voice call;
send, via the communication interface, a call transfer request message to a switch connected to a telephone network handling the active VoIP voice call;
receive, via the communication interface, the active VoIP voice call that has been routed from the switch; and
forward, via a wireless network, the active VoIP voice call to the VoIP client application at the mobile device, wherein forwarding the active VoIP voice call comprises:
dialing a mobile telephone number of the mobile device in the wireless network, wherein the mobile telephone number is different than the VoIP telephone number.

9. The network mobility device of claim 8, wherein the processing unit is further configured to forward the active VoIP voice call to the VoIP client application via the data network and the wireless network.

10. The network mobility device of claim 8, wherein the processing unit is further configured to:
receive, via the communication interface, a status message from the docking station indicating that the mobile device has undocked from the docking station,
wherein determining if the mobile device is undocked from the docking station while engaged in the active VoIP voice call is based on the received status message.

11. The network mobility device of claim 8, wherein the processing unit is further configured to:
register the network mobility device with the switch connected to the telephone network.

12. The network mobility device of claim 8, wherein the switch comprises a Public Branch Exchange (PBX) and the telephone network comprises a Public Switched Telephone Network (PSTN).

13. The network mobility device of claim 8, wherein the docking station comprises a Voice over Internet Protocol (VoIP) phone that has a wired connection to the data network and has a docking port for docking the mobile device and wherein the mobile device comprises a portable digital computing device that has the capability to communicate via multiple different types of network connections.

14. The network mobility device of claim 13, wherein the portable digital computing device comprises a cellular telephone, a tablet computer, or a personal digital assistant (PDA).

15. A docking station, comprising:
a docking port configured to physically dock with a mobile device, wherein the docking port includes an input/output port;
a communication interface connected to a packet-switched network; and
a processing unit configured to:
determine whether the mobile device is docked in the docking port,
determine, if the mobile device is docked in the docking port, whether the mobile device is engaged in an active call via the input/output port, the communication interface and the packet-switched network, and
cause a status message to be sent, via the communication interface and the packet-switched network, to a network device in the packet-switched network, wherein the status message indicates if the mobile device is, or is not, docked in the docking port and whether the mobile device is engaged in the active call,
wherein, when causing the status message to be sent, the processing unit is configured to cause the status message to be sent periodically, via the communication interface and the packet-switched network, to the network device in the packet-switched network.

16. The docking station of claim 15, wherein the docking station comprises a Voice over Internet Protocol (VoIP) phone and wherein the communication interface includes a wired connection to the packet-switched network.

17. The method of claim 1, wherein the network mobility device is located in a packet-switched network.

18. The method of claim 1, wherein the wireless network comprises a wireless public land mobile network (PLMN).

19. The network mobility device of claim 8, wherein the data network comprises a packet-switched network.

20. The network mobility device of claim 8, wherein the wireless network comprises a wireless public land mobile network (PLMN).

\* \* \* \* \*